US012317281B2

(12) United States Patent
Abotabl et al.

(10) Patent No.: US 12,317,281 B2
(45) Date of Patent: May 27, 2025

(54) REPURPOSING SKIPPING IN UPLINK CONFIGURED GRANT TO IMPROVE UPLINK COVERAGE

(71) Applicant: QUALCOMM Incorporated, San Diego, CA (US)

(72) Inventors: Ahmed Attia Abotabl, San Diego, CA (US); Yi Huang, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/814,023

(22) Filed: Jul. 21, 2022

(65) Prior Publication Data

US 2024/0032046 A1 Jan. 25, 2024

(51) Int. Cl.
*H04W 72/14* (2009.01)
*H04L 1/08* (2006.01)
*H04W 52/36* (2009.01)
*H04W 72/23* (2023.01)

(52) U.S. Cl.
CPC ............ *H04W 72/23* (2023.01); *H04L 1/08* (2013.01); *H04W 52/365* (2013.01)

(58) Field of Classification Search
CPC . H04W 72/23; H04W 74/0833; H04W 76/28; H04L 1/189; H04L 5/0094
See application file for complete search history.

(56) References Cited

U.S. PATENT DOCUMENTS

| 2010/0034139 A1* | 2/2010 | Love | H04L 1/0057 370/328 |
|---|---|---|---|
| 2021/0144743 A1* | 5/2021 | Rastegardoost | H04W 72/23 |
| 2022/0210823 A1 | 6/2022 | Alfarhan et al. | |

OTHER PUBLICATIONS

International Search Report and Written Opinion—PCT/US2023/069078—ISA/EPO—Oct. 11, 2023.

* cited by examiner

*Primary Examiner* — Pamit Kaur
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, an uplink configured grant configuration that identifies resources for periodic uplink configured grant occasions. The UE may transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold. Numerous other aspects are described.

30 Claims, 13 Drawing Sheets

REPURPOSING SKIPPING IN UPLINK CONFIGURED GRANT TO IMPROVE UPLINK COVERAGE

FIELD OF THE DISCLOSURE

Aspects of the present disclosure generally relate to wireless communication and to techniques and apparatuses for repurposing skipping in uplink configured grant (UL-CG) to improve uplink coverage.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, an uplink configured grant configuration that identifies resources for periodic uplink configured grant occasions. The one or more processors may be configured to transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

Some aspects described herein relate to a network node for wireless communication. The network node may include a memory and one or more processors coupled to the memory. The one or more processors may be configured to transmit, to a UE, an uplink configured grant configuration that identifies resources for periodic uplink configured grant occasions. The one or more processors may be configured to receive, from the UE in an uplink configured grant occasion of the periodic uplink configured grant occasions, a configured grant uplink communication based at least in part on one or more previous configured grant uplink communications.

Some aspects described herein relate to a method of wireless communication performed by a UE. The method may include receiving, from a network node, an uplink configured grant configuration that identifies resources for periodic uplink configured grant occasions. The method may include transmitting, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

Some aspects described herein relate to a method of wireless communication performed by a network node. The method may include transmitting, to a UE, an uplink configured grant configuration that identifies resources for periodic uplink configured grant occasions. The method may include receiving, from the UE in an uplink configured grant occasion of the periodic uplink configured grant occasions, a configured grant uplink communication based at least in part on one or more previous configured grant uplink communications.

Some aspects described herein relate to a non-transitory computer-readable medium that stores a set of instructions for wireless communication by a UE. The set of instructions, when executed by one or more processors of the UE, may cause the UE to receive, from a network node, an uplink configured grant configuration that identifies resources for periodic uplink configured grant occasions. The set of instructions, when executed by one or more processors of the UE, may cause the UE to transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

Some aspects described herein relate to a non-transitory computer-readable medium that stores a set of instructions for wireless communication by a network node. The set of instructions, when executed by one or more processors of the network node, may cause the network node to transmit, to a UE, an uplink configured grant configuration that identifies resources for periodic uplink configured grant occasions. The set of instructions, when executed by one or more processors of the network node, may cause the network node to receive, from the UE in an uplink configured grant occasion of the periodic uplink configured grant occasions, a configured grant uplink communication based at least in part on one or more previous configured grant uplink communications.

Some aspects described herein relate to an apparatus for wireless communication. The apparatus may include means for receiving, from a network node, an uplink configured grant configuration that identifies resources for periodic uplink configured grant occasions. The apparatus may include means for transmitting, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

Some aspects described herein relate to an apparatus for wireless communication. The apparatus may include means for transmitting, to a UE, an uplink configured grant configuration that identifies resources for periodic uplink configured grant occasions. The apparatus may include means for receiving, from the UE in an uplink configured grant occasion of the periodic uplink configured grant occasions, a configured grant uplink communication based at least in part on one or more previous configured grant uplink communications.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
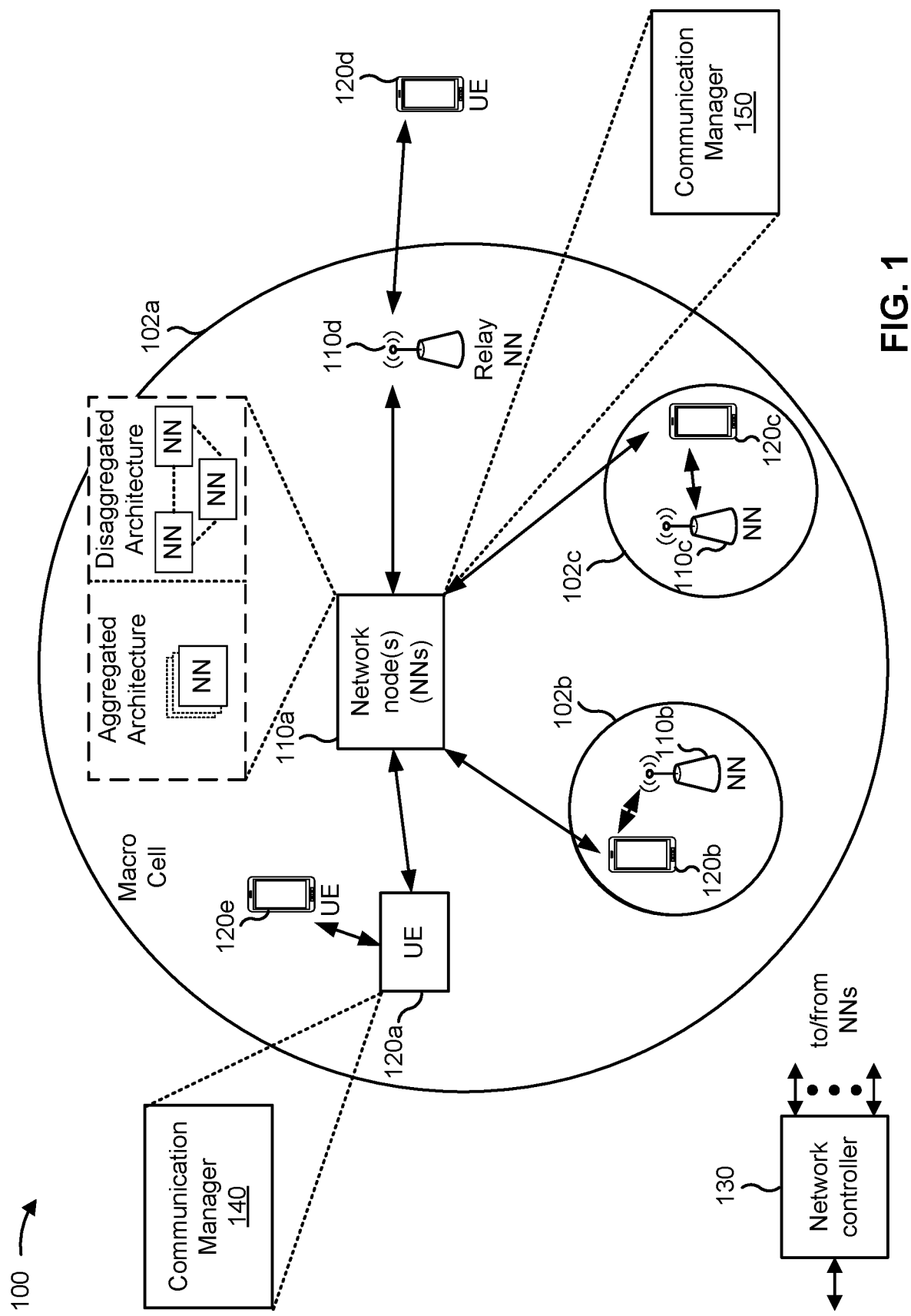
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, an uplink configured grant configuration that identifies resources for periodic uplink configured grant occasions; and transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold. Additionally, or alternatively, the communication manager 140 may perform one or more other operations described herein.

In some aspects, the network node 110 may include a communication manager 150. As described in more detail elsewhere herein, the communication manager 150 may transmit, to a UE, an uplink configured grant configuration that identifies resources for periodic uplink configured grant occasions; and receive, from the UE in an uplink configured grant occasion of the periodic uplink configured grant occasions, a configured grant uplink communication based at least in part on one or more previous configured grant uplink communications. Additionally, or alternatively, the communication manager 150 may perform one or more other operations described herein.

As indicated above, FIG. 1 is provided as an example. Other examples may differ from what is described with regard to FIG. 1.

Figure 2:
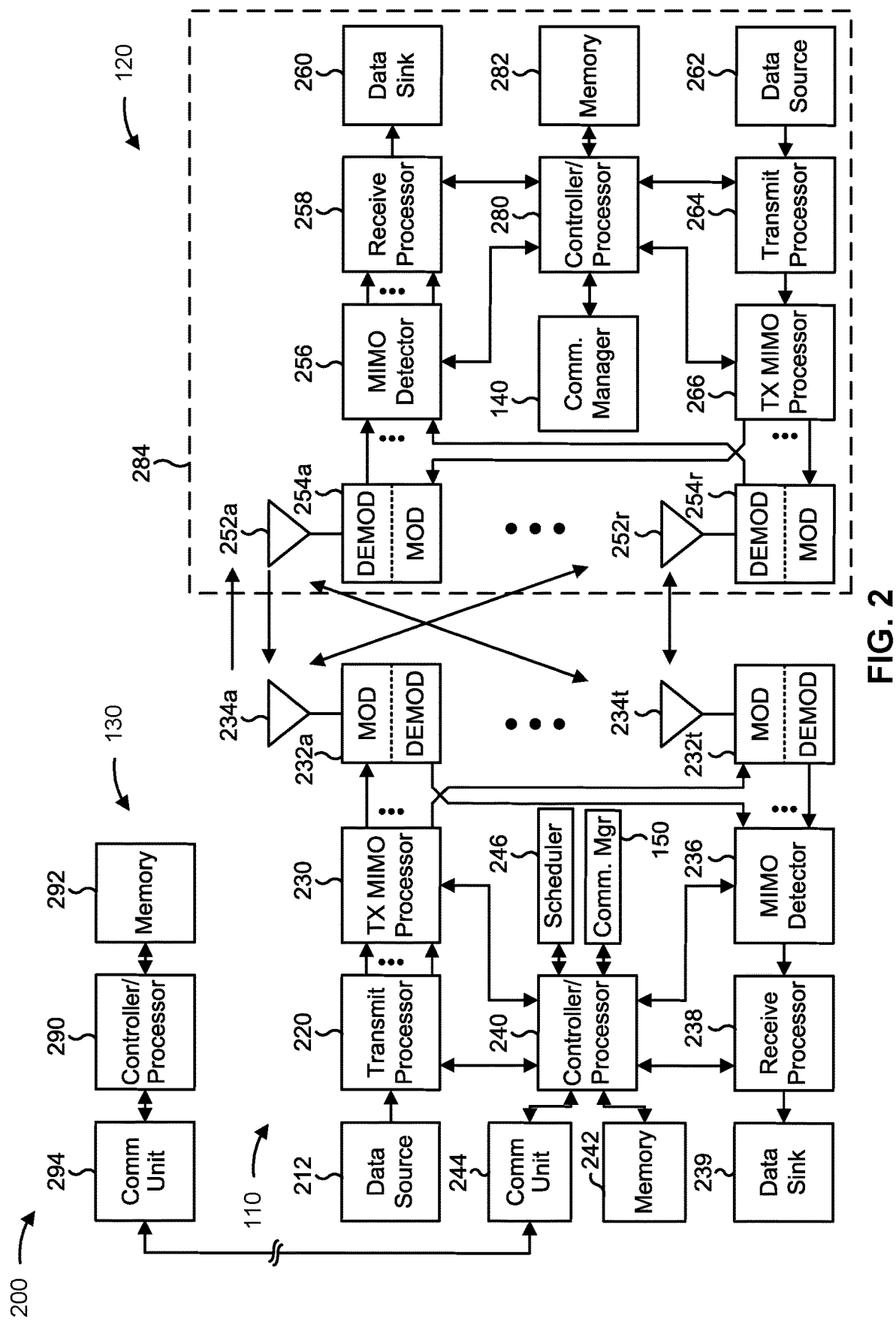
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the network node 110, the controller/processor 280 of the UE 120, and/or any other component(s) of FIG. 2 may perform one or more techniques associated with repurposing skipping in uplink configured grant to improve uplink coverage, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, an uplink configured grant configuration that identifies resources for periodic uplink configured grant occasions; and/or means for transmitting, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE, an uplink configured grant configuration that identifies resources for periodic uplink configured grant occasions; and/or means for receiving, from the UE in an uplink configured grant occasion of the periodic uplink configured grant occasions, a configured grant uplink communication based at least in part on one or more previous configured grant uplink communications. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
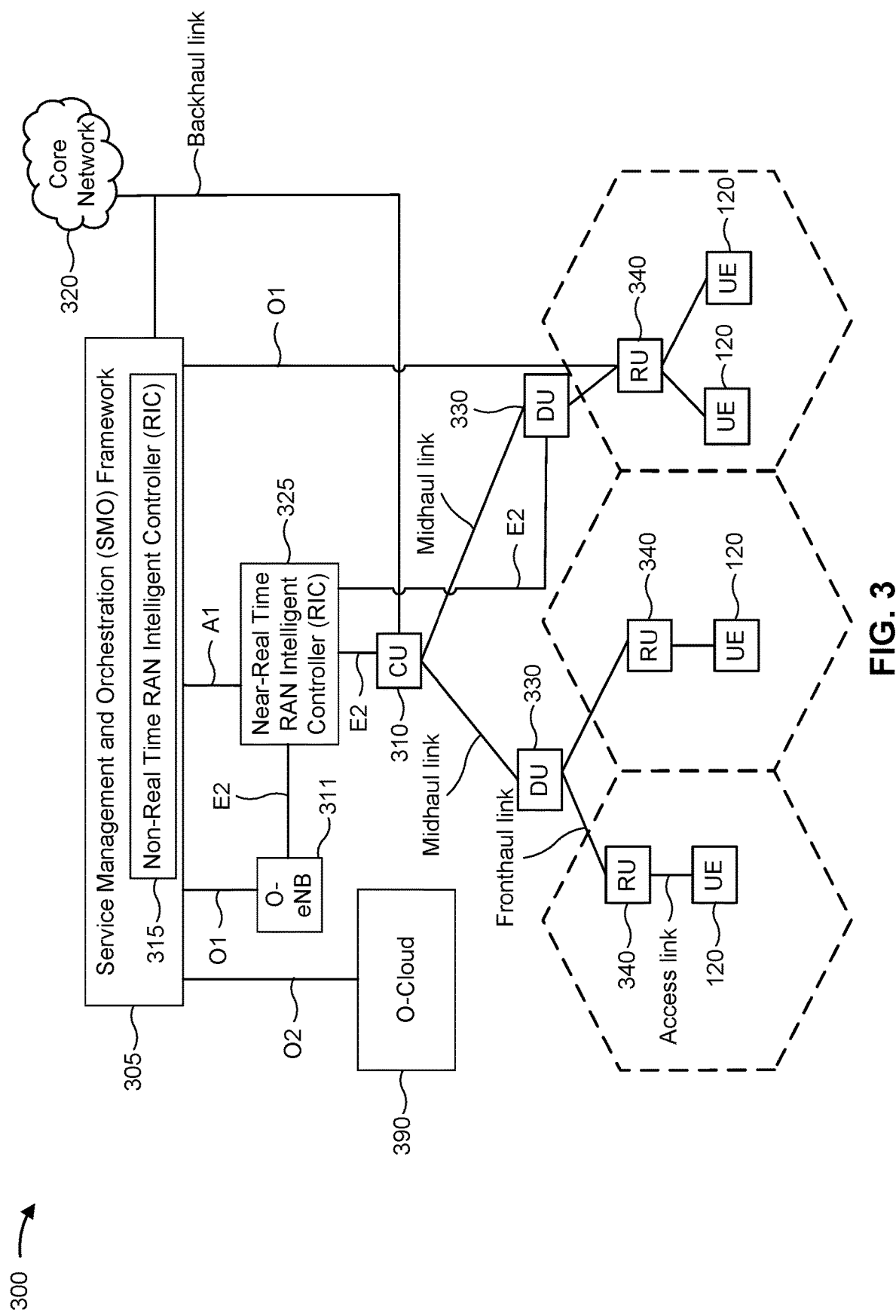
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
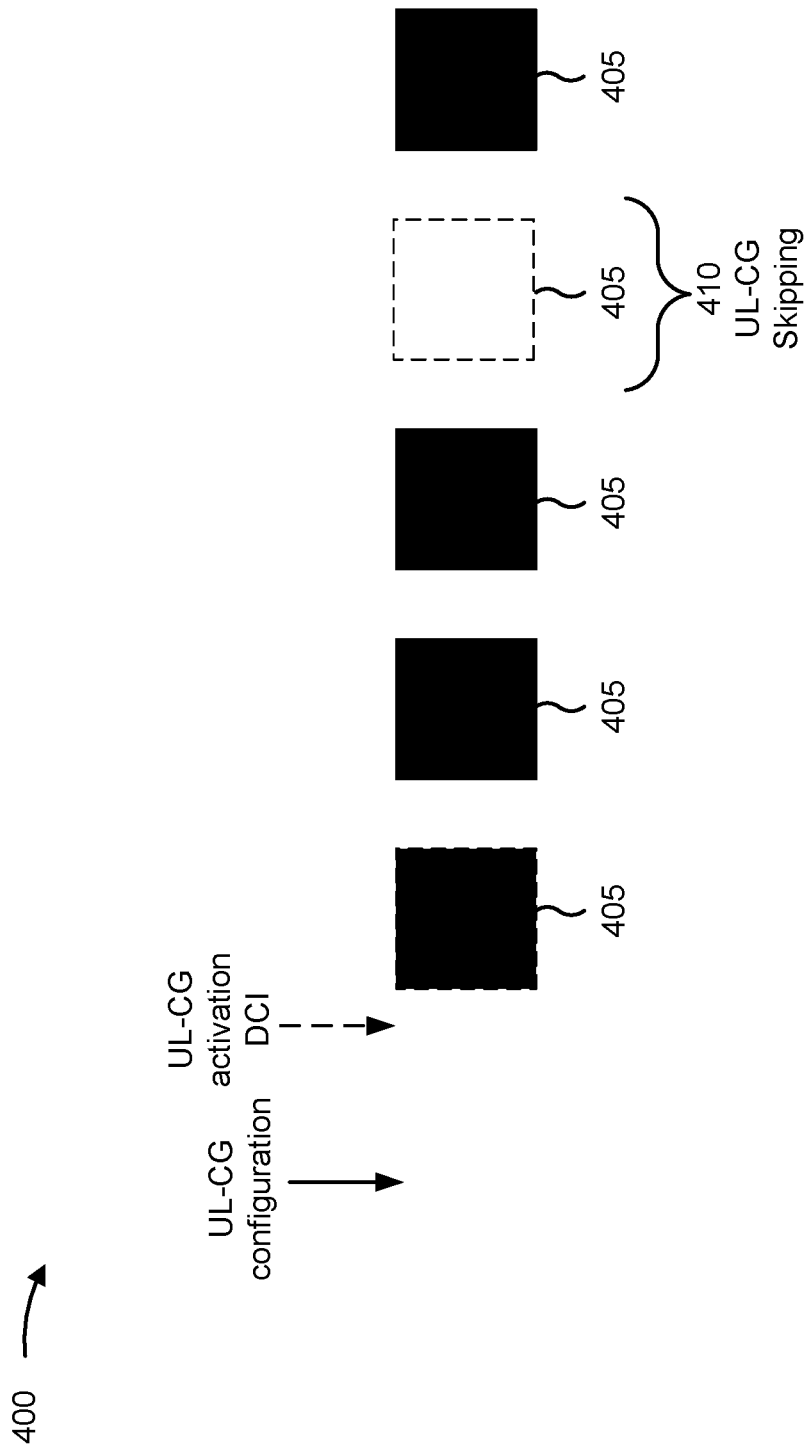
FIG. 4 is a diagram illustrating an example of uplink configured grant (UL-CG) communication, in accordance with the present disclosure.

FIG. 4 is a diagram illustrating an example 400 of uplink configured grant (UL-CG) communication, in accordance with the present disclosure. Configured grant (CG) communications may include periodic uplink communications that are configured for a UE, such that a network node does not need to send separate downlink control information (DCI) to schedule each uplink communication, thereby conserving signaling overhead.

As shown in example 400, a UE may be configured with an UL-CG configuration for CG communications. For example, the UE may receive the UL-CG configuration via an RRC message transmitted by a network node. The UL-CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled UL-CG occasions 405 for the UE. In some examples, the UL-CG configuration may identify a resource pool or multiple resource pools that are available to the UE for an uplink transmission. The UL-CG configuration may configure contention-free CG communications (e.g., where time and/or frequency resources are dedicated for the UE to transmit uplink communications) or contention-based CG communications (e.g., where the UE contends for access to a channel in the configured resource allocation, such as by using a channel access procedure or a channel sensing procedure).

The UE may be configured with a type of UL-CG that does not require DCI activation, or a type of UL-CG that requires DCI activation. In a case in which the UE is configured with the type of UL-CG that requires DCI activation, the network node may transmit UL-CG activation DCI to the UE to activate the UL-CG configuration for the UE. In this case, the network node may indicate, in the CG activation DCI, communication parameters, such as an MCS, a resource block (RB) allocation, and/or antenna ports, for the CG physical uplink shared channel (PUSCH) communications to be transmitted in the scheduled UL-CG occasions 405. The UE may begin transmitting in the UL-CG occasions 405 based at least in part on receiving the UL-CG activation DCI. For example, beginning with a next scheduled UL-CG occasion 405 subsequent to receiving the UL-CG activation DCI, the UE may transmit a PUSCH communication in the scheduled UL-CG occasions 405 using the communication parameters indicated in the UL-CG activation DCI. In a case in which the UE is configured with the type of UL-CG that requires DCI activation, the UE may refrain from transmitting in configured UL-CG occasions 405 prior to receiving the UL-CG activation DCI. In a case in which the UE is configured with the type of UL-CG that does not require DCI activation, the UE may begin transmitting PUSCH communications in the next scheduled UL-CG occasion subsequent to receiving the UL-CG configuration.

In each scheduled UL-CG occasion 405, if the UE has uplink data to transmit, the UE may transmit a CG uplink communication in the UL-CG occasion 405 using the resources identified by the UL-CG configuration. As shown by reference number 410, in some examples, the UE may perform UL-CG skipping for a scheduled UL-CG occasion 405. UL-CG skipping is a feature that enables the UE to skip the transmission of a CG grant uplink communication in a scheduled UL-CG occasion 405 in a case in which an uplink buffer of the UE is empty (or an amount of data in the uplink buffer is less than a threshold). That is, when the UE does not have uplink data to transmit (e.g., the uplink buffer is empty or the amount of data in the uplink buffer is less than a threshold), the UE may use UL-CG skipping to skip a scheduled UL-CG occasion 405. In this case, the UE may not indicate, to network node, that the UE is performing UL-CG skipping, and the network node may attempt decoding of the PUSCH resources configured for the scheduled occasion 405.

As indicated above, FIG. 4 is provided as an example. Other examples may differ from what is described with respect to FIG. 4.

Some techniques and apparatuses described herein enable repurposing scheduled UL-CG occasions in which a UE can use UL-CG skipping to improve uplink coverage for the UE. In some aspects, in connection with a determination that an amount of data in an uplink buffer does not satisfy a threshold, the UE may transmit, to a network node in a UL-CG occasion, a CG uplink communication that is based at least in part on one or more previous CG uplink communications. For example, the UE may transmit, in the UL-CG occasion, a repetition of a latest CG uplink communication transmitted in a last CG uplink occasion prior to the UL-CG uplink occasion, or the UE may transmit, in the UL-CG occasion, parity bits associated with previous CG uplink communications transmitted in a number of latest UL-CG occasions prior to the uplink configured grant occasion. The transmission, in the UL-CG occasion, of a repetition of a previous CG uplink communication or parity bits associated with a number of previous CG uplink communications, may increase the likelihood that the network node is able to decode one or more previous CG uplink communications transmitted, by the UE, in one or more previous UL-CG occasions. As a result, uplink coverage for the UE may be improved and network traffic latency may be reduced.

In some aspects, the UE may transmit, to the network node, an indication that indicates whether a CG uplink communication, transmitted in a UL-CG occasion, is a new data transmission or a transmission for improving uplink coverage (e.g., a CG uplink communication that is based at least in part on one or more previous CG uplink communications). As a result, confusion may be avoided at the network node as to whether the CG uplink communication is to be decoded as a new data transmission or to be used to improve uplink coverage (e.g., to be used to improve decoding of one or more previous CG uplink communications).

Figure 5:
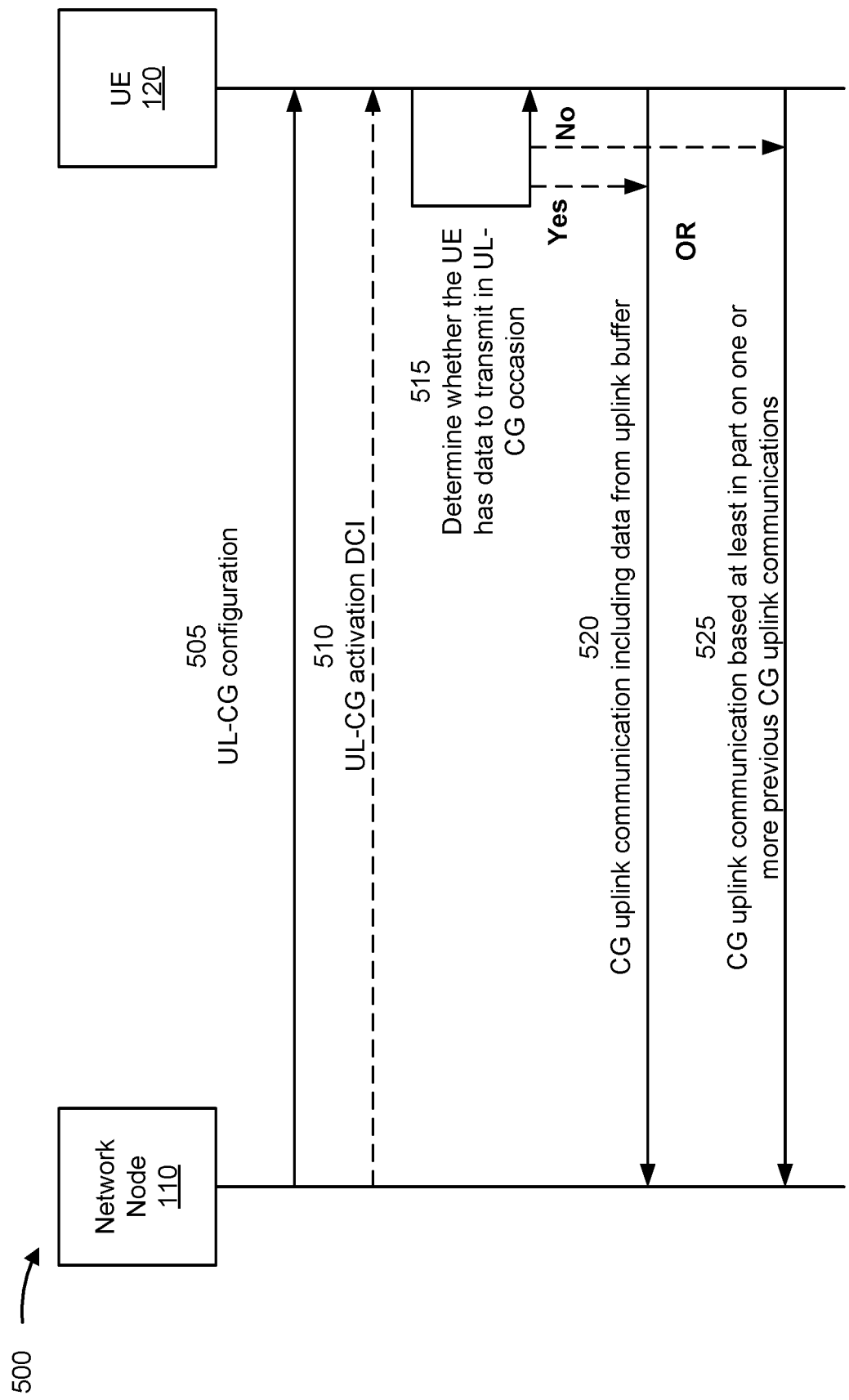
FIGS. 5-9 are diagrams illustrating examples associated with repurposing skipping in UL-CG to improve uplink coverage, in accordance with the present disclosure.

FIG. 5 is a diagram illustrating an example 500 associated with repurposing skipping in UL-CG to improve uplink coverage, in accordance with the present disclosure. As shown in FIG. 5, example 500 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

In some aspects, as shown in FIG. 5, and by reference number 505, the network node 110 may transmit, to the UE 120, a UL-CG configuration. The UE 120 may receive the UL-CG configuration transmitted by the network node 110. For example, the UE 120 may receive the UL-CG configuration via an RRC message transmitted by a network node 110. The UL-CG configuration may identify resources (e.g., time and frequency resources) for periodic UL-CG occasions. For example, the UL-CG configuration may indicate a resource allocation associated with CG uplink communications (e.g., in a time domain, frequency domain, spatial domain, and/or code domain) and a periodicity at which the resource allocation is repeated, resulting in periodically reoccurring UL-CG occasions for the UE. In some aspects, the UL-CG configuration may indicate a configuration of a type of UL-CG that requires DCI activation. In some aspects, UL-CG configuration may indicate a configuration of a type of UL-CG that does not require activation. In some aspects, the UL-CG configuration may include an indication of a repetition factor that configures a number of repetition instances in each of the periodic UL-CG occasions. The number of repetition instances corresponds to the number of times that a CG uplink communication is to be repeated in a UL-CG occasion.

As further shown in FIG. 5, and by reference number 510, in some aspects, the network node 110 may transmit, and the UE 120 may receive, UL-CG activation DCI that indicates activation of the UL-CG configuration. For example, the network node 110 may transmit the UL-CG activation DCI to the UE 120 to activate the UL-CG configuration in a case in which the UL-CG configuration indicates a configuration of the type of UL-CG that requires DCI activation. In this case, the periodic UL-CG occasions may be activated for the UE 120 based at least in part on the UE 120 receiving the UL-CG activation DCI.

In some aspects, in a case in which the UL-CG configuration indicates a configuration of the type of UL-CG that does not require DCI activation, the network node 110 may not transmit the UL-CG activation DCI to the UE 120. In this case, the periodic UL-CG occasions may be activated for the UE 120 based at least in part on the UE 120 receiving the UL-CG configuration, without receiving the UL-CG activation DCI.

As further shown in FIG. 5, and by reference number 515, the UE 120 may determine whether the UE 120 has data to transmit in a UL-CG occasion. In some aspects, the UE 120 may determine, at a time associated with the UL-CG occasion, whether an amount of data in an uplink buffer of the UE 120 satisfies (e.g., is greater than or equal to) a threshold. In a case in which the amount of data in the uplink buffer satisfies (e.g., is greater than or equal to) the threshold, the UE 120 may determine that the UE 120 has data to transmit in the UL-CG occasion. In a case in which the amount of data in the uplink buffer does not satisfy (e.g., is less than) the threshold, the UE 120 may determine that the UE 120 does not have data to transmit in the UL-CG occasion. For example, in the case in which the data in the uplink buffer does not satisfy the threshold, the uplink buffer of the UE 120 may be empty, or the uplink buffer of the UE 120 may include only a small quantity of bits that do not fit in the resources (e.g., would not efficiently fill the resources) to be transmitted in the UL-CG occasion. The UE 120 may perform the determination of whether the UE 120 has data to transmit for each of the periodically occurring UL-CG occasions.

As further shown in FIG. 5, and by reference number 520, in connection with a determination that the UE 120 has data to transmit in a UL-CG occasion, the UE 120 may transmit, in the UL-CG occasion, a CG uplink communication that includes the data (e.g., data in the uplink buffer of the UE 120). For example, the UE 120 may transmit, in a UL-CG occasion, a CG uplink communication that includes data from the uplink buffer (e.g., new data not included in a previous uplink communication), in connection with a determination that the amount of data in the uplink buffer satisfies (e.g., is greater than or equal to) the threshold. The UE 120 may transmit respective CG uplink communications including new data (e.g., data from the uplink buffer) in each UL-CG occasion, of the periodically occurring UL-CG occasions, for the amount of data in the uplink buffer that satisfies (e.g., is greater than or equal to) the threshold. The network node 110 may receive the CG uplink communications transmitted in such UL-CG occasions, and the network node 110 may decode (or attempt to decode) the CG uplink communications.

As further shown in FIG. 5, and by reference number 525, in some aspects, in connection with a determination that the UE 120 does not have data to transmit in a UL-CG occasion, the UE 120 may transmit, in the UL-CG occasion, a UL-CG uplink communication that is based at least in part on one or more previous configured grant uplink communications. For example, in some aspects, the UE 120 may transmit, to the network node 110 in a UL-CG occasion, a CG uplink communication that is based at least in part on one or more previous CG uplink communications transmitted by the UE 120 in one or more previous UL-CG occasions, in connection with a determination that the amount of data in the uplink buffer does not satisfy (e.g., is less than) the threshold. The CG uplink communication that is based at least in part on one or more previous CG uplink communications may be a transmission for improving uplink coverage. In some aspects, the determination that the amount of data in the uplink buffer does not satisfy the threshold may correspond to a condition associated with UL-CG skipping, and the UE 120 may transmit the transmission for improving uplink coverage (e.g., the CG uplink communication based at least in part on one or more previous CG uplink communications) in the UL-CG occasion instead of skipping the UL-CG occasion.

The network node 110 may receive, in the UL-CG occasion, the CG uplink communication based at least in part on one or more previous CG uplink communications. The network node 110 may use the CG uplink communication based at least in part on one or more previous CG uplink communications to improve decoding of the one or more previous CG uplink communications. For example, the network node 110 may attempt to decode the one or more previous CG uplink communications based at least in part on a combination of information included in the one or more previous CG uplink communications and information included in the CG uplink communication based at least in part on the one or more previous CG uplink communications. In some aspects, the network node 110 may decode at least one previous CG uplink communication, of the one or more previous CG uplink communications, based at least in part on the CG uplink communication received in the UL-CG occasion (e.g., the CG uplink communication based at least in part on the one or more previous CG uplink communications).

In some aspects, the UE 120 may transmit, in the UL-CG occasion, the CG uplink communication that is based at least in part on one or more previous CG uplink communications, in connection with the determination that the amount of data in the uplink buffer does not satisfy the threshold and a determination that a power headroom of the UE 120 satisfies a power threshold. For example, when the UE 120 determines that the UE 120 does not have data to transmit in a UL-CG occasion (e.g., the amount of data in the uplink buffer does not satisfy the threshold), the UE 120 may then determine whether the power headroom satisfies (e.g., is greater than or equal to) the power threshold. The power headroom of the UE 120 indicates how much transmission power is left for the UE 120 to use in addition to the power being used by a current transmission. In some aspects, the UE 120 may report the power headroom to the network node 110 in a power headroom report (PHR). In some aspects, in a case in which the UE 120 determines that the amount of data in the uplink buffer does not satisfy the threshold, and the UE 120 determines that the power headroom satisfies the power threshold, the UE 120 may transmit, in the UL-CG occasion, a transmission for improving uplink coverage (e.g., the CG uplink communication based at least in part on one or more previous CG uplink communications). In some aspects, in a case in which the UE 120 determines that the amount of data in the uplink buffer does not satisfy the threshold, and the UE 120 determines that the power headroom does not satisfy the power threshold, the UE 120 may skip transmission of a CG uplink communication in the UL-CG occasion. In this way, when the UE 120 has sufficient power (e.g., the power headroom satisfies the power threshold), the UE 120 may utilize a UL-CG occasion for which UE 120 does not have data to transmit to improve uplink coverage. When the UE 120 does not have sufficient power (e.g., the power headroom does not satisfy the power threshold), the UE 120 may conserve power by reverting to UL-CG skipping in a UL-CG for which the UE 120 does not have data to transmit.

In some aspects, the CG uplink communication that is based at least in part on one or more previous CG uplink communications may be a repetition of a previous CG uplink communication transmitted in a previous UL-CG occasion. For example, in connection with the determination that the UE 120 does not have data to transmit in a UL-CG occasion (e.g., the amount of data in the uplink buffer does not satisfy the threshold), the UE 120 may transmit, in the UL-CG occasion, a repetition of the previous CG uplink communication transmitted in the last UL-CG grant occasion prior to the uplink configured grant occasion. In this case, instead of skipping the UL-CG occasion, the UE 120 may repeat the transmission of the latest CG uplink communication transmitted in the most recent preceding UL-CG occasion. This may increase a likelihood of the network node 110 successfully decoding the previous CG uplink communication transmitted in the most recent preceding UL-CG occasion. For example, the network node 110 may receive the repetition of the previous CG uplink communication, and the network node 110 may decode the previous CG uplink communication based at least in part on the previous CG uplink communication and the repetition of the CG uplink communication.

In some aspects, the CG uplink communication that is based at least in part on one or more previous CG uplink communications may be a CG uplink communication that includes extra parity bits associated with multiple previous CG uplink communications transmitted in prior UL-CG occasions. For example, in connection with the determination that the UE 120 does not have data to transmit in a UL-CG occasion (e.g., the amount of data in the uplink buffer does not satisfy the threshold), the UE 120 may transmit, in the UL-CG occasion, parity bits associated with previous CG uplink communications transmitted in a quantity (X) of latest UL-CG occasions prior to the UL-CG occasion. The parity bits associated with a previous CG uplink communication may include a set of bits, generated from information bits included in the previous CG uplink communication, that provide a representation of all or a subset of the information bits included in the previous CG uplink communication. For example, the parity bits associated with a previous CG uplink communication may be a set of bits resulting from combining multiple information bits, included in the previous CG uplink communication, using an exclusive or (XOR) operator, or another operator. In some aspects, the number of parity bits associated with each of the X previous CG uplink communications may be based at least in part on X, and based at least in part on the resources configured for each UL-CG occasion (e.g., a size of the resources configured for of the CG uplink communication in each UL-CG occasion).

In some aspects, the network node 110 may receive the parity bits associated with the X previous CG uplink communications, and the parity bits associated with a previous CG uplink communication may increase a likelihood of the network node 110 successfully decoding the information bits of the previous CG uplink communication. For example, in some aspects, the network node 110 may decode one or more information bits that were unsuccessfully decoded in a previous CG uplink communication based at least in part on the parity bits associated with the previous CG uplink communication and one or more information bits that were successfully decoded in the previous CG uplink communication.

In some aspects, the network node 110 may transmit, and the UE 120 may receive, an indication of X (e.g., the quantity of latest UL-CG occasions for which parity bits are to be included in the CG uplink communication). In some aspects, X may be RRC configured for the UE 120. For example, an indication of X may be included in the UL-CG configuration. Additionally, or alternatively, X may be indicated via a medium access control (MAC) control element (MAC-CE) or DCI. In some aspects, X may be based at least in part on the one or more configuration parameters included in the UL-CG configurations. In some aspects, X may be based at least in part on an RRC mapping (e.g., included in the UL-CG configuration) between values for one or more configuration parameters in the UL-CG configuration and values for X For example, X may be implicitly indicated by an RRC mapping between different values for the periodicity of the UL-CG occasions and different values for X. In this case, the UE 120 may determine the value for X, based at least in part on the periodicity indicated in the UL-CG configuration, in accordance with the RRC mapping.

In some aspects, the behavior of the UE 120 in a UL-CG occasion in which the UE 120 does not have data to transmit may be based at least in part on an indication transmitted by the network node 110, and received by the UE 120. For example, the indication may be transmitted to the UE 120 via an RRC message (e.g., in the UL-CG configuration), a MAC-CE, or DCI (e.g., a dynamic indication). In some aspects, the indication may indicate whether the UE 120 is to transmit a transmission for improving uplink coverage or whether the UE 120 is to perform UL-CG skipping, in a UL-CG occasion in which the UE 120 does not have data to transmit. In some aspects, the indication may indicate a type of transmission for improving uplink coverage (e.g., repetition of a previous CG uplink communication or parity bits associated with X previous CG uplink communications) to be transmitted by the UE 120 in a UL-CG occasion in which the UE 120 does not have data to transmit.

In some aspects, the behavior of the UE 120 in a UL-CG occasion in which the UE 120 does not have data to transmit may be based at least in part on one or more configuration parameters included in the UL-CG configuration. In some aspects, the behavior of the UE 120 in a UL-CG occasion in which the UE 120 does not have data to transmit may be implicitly indicated based at least in part on an RRC mapping (e.g., included in the UL-CG configuration) between different UE behaviors and different values of one or more configuration parameters included in the UL-CG configuration. In this case, the different UE behaviors may include one or more types of transmissions for improving uplink coverage and/or UL-CG skipping. For example, the one or more types of transmissions for improving uplink coverage may include repetition of a previous CG uplink communication and/or parity bits associated with X previous CG uplink communications, with one or more values for X. In some aspects, the RRC mapping may indicate a mapping between different values of the periodicity of the UL-CG occasions and the different UE behaviors. For example, in this case, in a UL-CG occasion in which the UE 120 does not have data to transmit, the UE 120 may transmit a repetition of a previous CG uplink communication, the UE 120 may transmit parity bits associated with X previous CG uplink communications (e.g., with one or more values for X), or the UE 120 may perform UL-CG skipping, based at least in part on the UE behavior that corresponds to the periodicity indicated in the UL-CG configuration.

In a case in which the UL-CG configuration indicates a repetition factor that configures multiple repetition instances in each UL-CG occasion, the UE 120 may repeat the transmission of a CG uplink communication including data from the uplink buffer (e.g., a new data transmission) in each of the multiple repetition instances in a UL-CG occasion. In some aspects, in a case in which the UL-CG configuration indicates a repetition factor that configures multiple repetition instances in each UL-CG occasion, the UE 120 may transmit, in the multiple repetition instances in the UL-CG occasion, multiple repetitions of the previous CG uplink communication transmitted in the latest preceding UL-CG occasion in the multiple repetition instances. For example, the UE 120 may repeat the transmission of the repetition of the same previous CG uplink communication (e.g., the CG uplink communication transmitted in the previous UL-CG occasion) in each of the multiple repetition instances in the UL-CG occasion. In some aspects, in a case in which the UL-CG configuration indicates a repetition factor that configures multiple repetition instances in each UL-CG occasion, the UE 120 may transmit, in the multiple repetition instances in the UL-CG occasion, repetitions of multiple previous CG uplink communications transmitted in multiple UL-CG occasions preceding the UL-CG occasion. For example, in a case in which N repetition instances are configured in each UL-CG occasion, the UE 120 may transmit, in each of the N repetition instances in the UL-CG occasion, a repetition of a previous CG uplink communication transmitted in a respective one of the latest N UL-CG occasions prior to the UL-CG occasion.

In some aspects, the UE 120 may transmit, and the network node 110 may receive, an indication of whether a CG uplink occasion includes a new data transmission (e.g., a CG uplink communication included data from the uplink buffer of the UE 120) or a transmission for improving uplink coverage (e.g., a CG uplink communication based at least in part on one or more previous CG uplink communications). Additionally, or alternatively, the indication may indicate a type of transmission for improving uplink coverage. For example, in some aspects, the indication may indicate whether a CG uplink occasion includes a new data transmission (e.g., a CG uplink communication including data from the uplink buffer of the UE 120), a repetition of a previous CG uplink communication, or parity bits associated with a quantity (X) of previous CG uplink communications. In some aspects, the indication may be included in CG uplink control information (CG-UCI) transmitted in the UL-CG occasion. For example, the CG-UCI may include dedicated bits for indicating whether the corresponding CG uplink communication, in the UL-CG occasion, includes new data, a repetition of a previous CG uplink communication, or parity bits associated with quantity (X) of previous CG uplink communications. In some aspects, the indication may be included in the payload of a CG uplink communication, a direct grant PUSCH communication, or a direct grant physical uplink control channel (PUCCH) communication. In this case, the indication may indicate a grant identifier (ID) associated with the UL-CG occasion to which the indication applies.

As indicated above, FIG. 5 is provided as an example. Other examples may differ from what is described with respect to FIG. 5.

Figure 6:
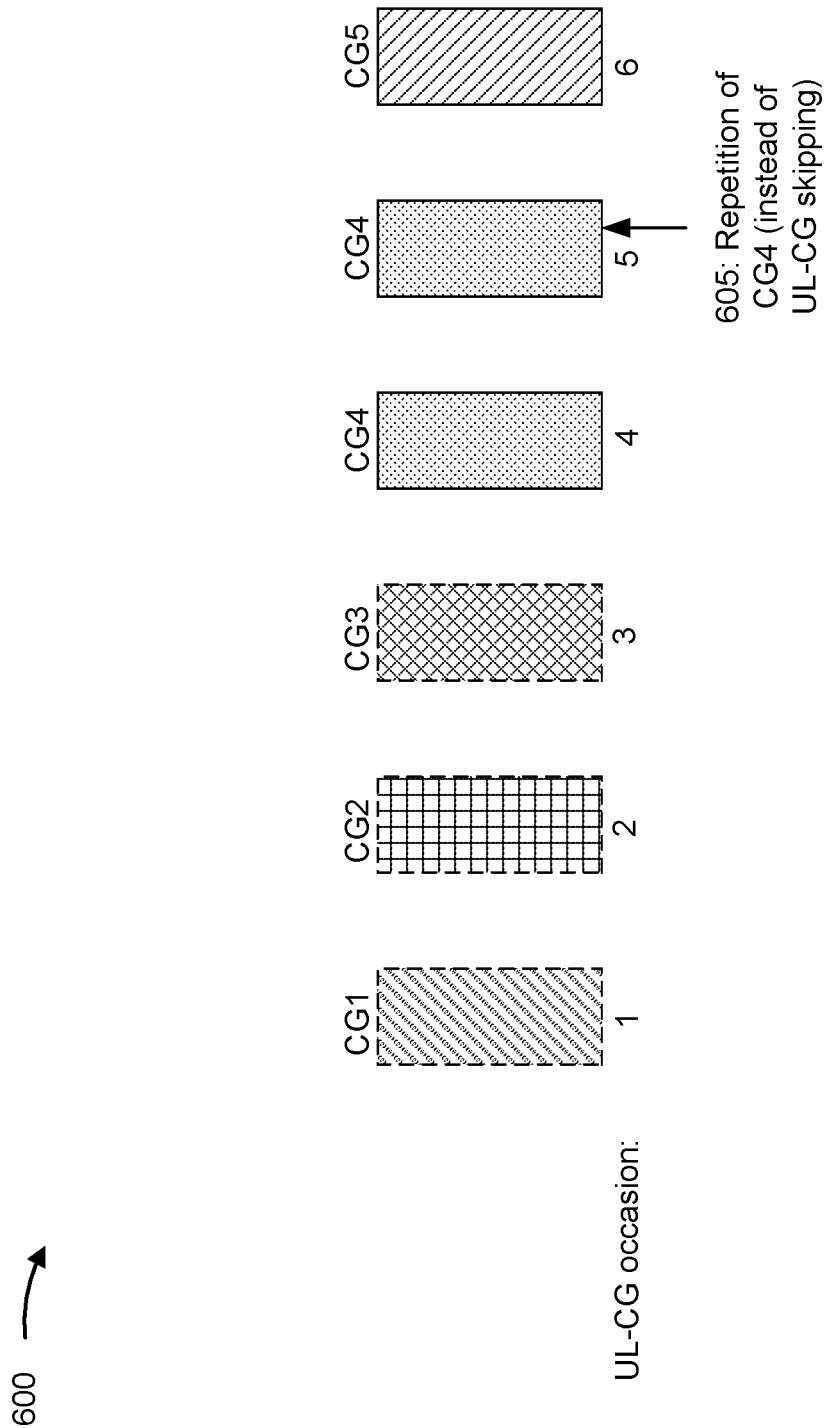

FIG. 6 is a diagram illustrating an example 600 associated with repurposing skipping in UL-CG to improve uplink coverage, in accordance with the present disclosure. Example 600 includes CG uplink communications in periodic UL-CG occasions. As shown in FIG. 6, a UE may transmit a first CG uplink communication (CG1) in a first UL-CG occasion. The UE may transmit a second CG uplink communication (CG2) in a second UL-CG occasion. The UE may transmit a third CG uplink communication (CG3) in a third UL-CG occasion. The UE may transmit a fourth CG uplink communication (CG2) in a fourth UL-CG occasion. The UE may transmit a fifth CG uplink communication (CG5) in a sixth UL-CG occasion.

In some aspects, the UE may determine that the UE does not have data to transmit (e.g., the amount of data in the uplink buffer of the UE does not satisfy a threshold) in the fifth UL-CG occasion. As shown by reference number 605, in some aspects, in connection with the determination that the UE does not have data to transmit in the fifth UL-CG occasion, the UE may transmit, in the fifth UL-CG occasion, a repetition of the CG uplink communication transmitted in the last UL-CG occasion prior to the fifth UL-CG occasion, instead of performing UL-CG skipping for the fifth UL-CG occasion. In this case, the UE may transmit, in the fifth UL-CG occasion, a repetition of CG4 (e.g., the CG uplink communication transmitted in the fourth UL-CG occasion).

As indicated above, FIG. 6 is provided as an example. Other examples may differ from what is described with respect to FIG. 6.

Figure 7:
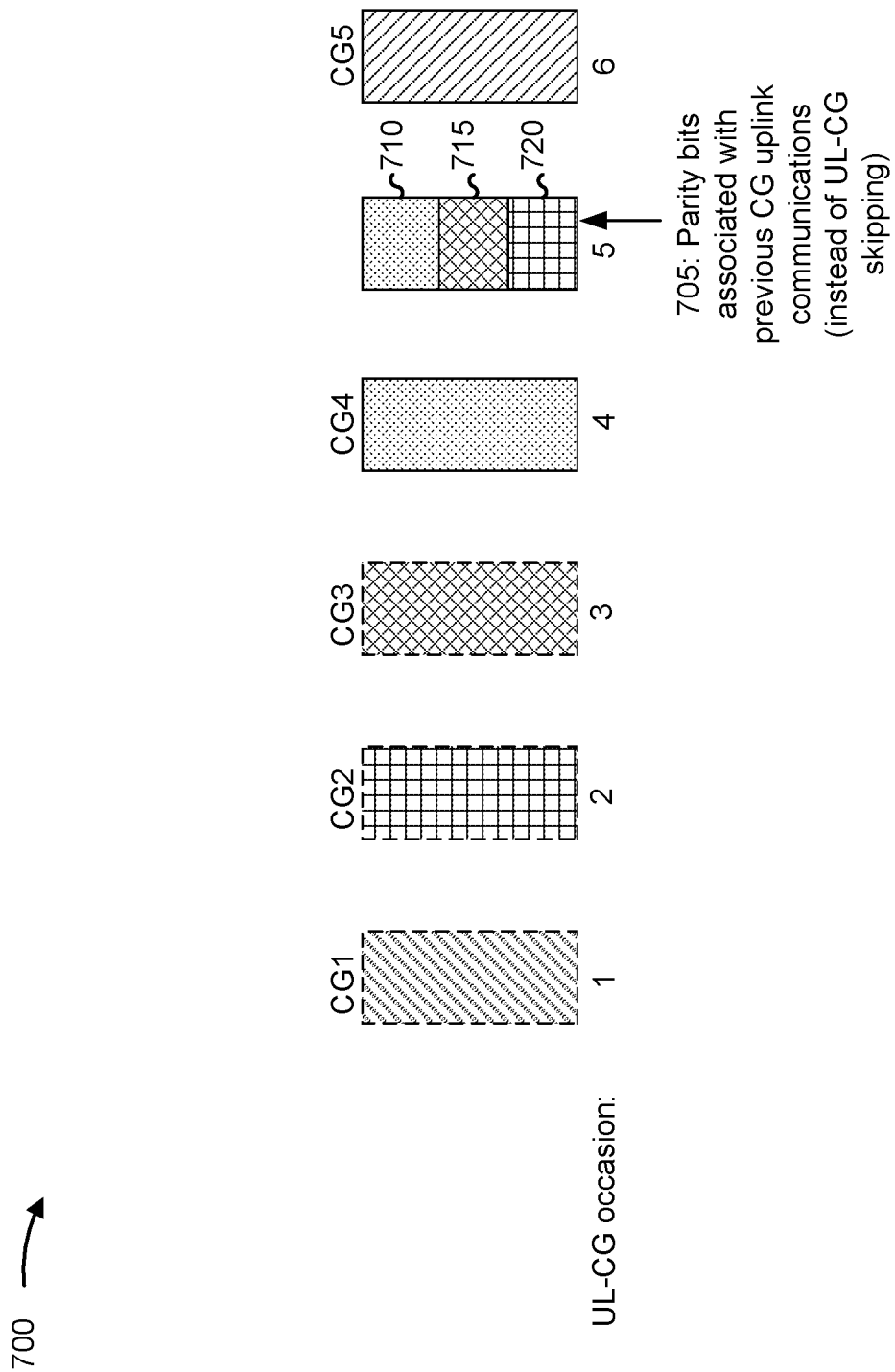

FIG. 7 is a diagram illustrating an example 700 associated with repurposing skipping in UL-CG to improve uplink coverage, in accordance with the present disclosure. Example 700 includes CG uplink communications in periodic UL-CG occasions. As shown in FIG. 7, a UE may transmit a first CG uplink communication (CG1) in a first UL-CG occasion. The UE may transmit a second CG uplink communication (CG2) in a second UL-CG occasion. The UE may transmit a third CG uplink communication (CG3) in a third UL-CG occasion. The UE may transmit a fourth CG uplink communication (CG2) in a fourth UL-CG occasion. The UE may transmit a fifth CG uplink communication (CG5) in a sixth UL-CG occasion.

In some aspects, the UE may determine that the UE does not have data to transmit (e.g., the amount of data in the uplink buffer of the UE does not satisfy a threshold) in the fifth UL-CG occasion. As shown by reference number 705, in some aspects, in connection with the determination that the UE does not have data to transmit in the fifth UL-CG occasion, the UE may transmit, in the fifth UL-CG occasion, parity bits associated with previous CG uplink communications in X latest UL-CG occasions prior to the fifth UL-CG occasion, instead of performing UL-CG skipping for the fifth UL-CG occasion. As shown in FIG. 7, in a case in which X=3, the UE may transmit, in the fifth UL-CG occasion, a first set of parity bits 710 associated with CG4 (e.g., the CG uplink communication transmitted in the fourth UL-CG occasion), a second set of parity bits 715 associated with CG3 (e.g., the CG uplink communication transmitted in the third UL-CG occasion), and a third set of parity bits 720 associated with CG2 (e.g., the CG uplink communication transmitted in the second UL-CG occasion).

As indicated above, FIG. 7 is provided as an example. Other examples may differ from what is described with respect to FIG. 7.

Figure 8:
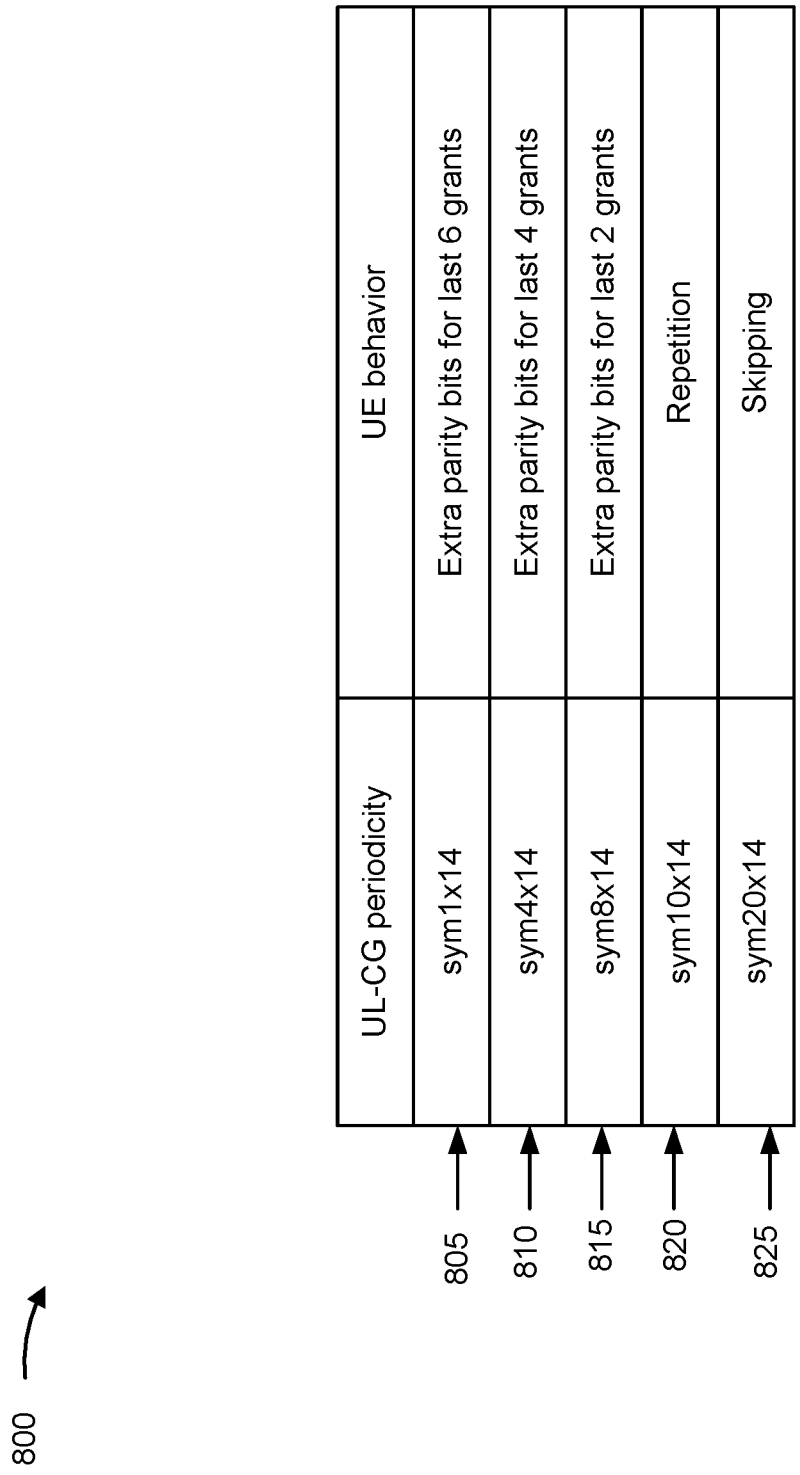

FIG. 8 is a diagram illustrating an example 800 associated with repurposing skipping in UL-CG to improve uplink coverage, in accordance with the present disclosure. In some aspects, the UE behavior in a UL-CG occasion in which the UE does not have data to transmit (e.g., the amount of data in the uplink buffer of the UE does not satisfy a threshold) may be based at least in part on a mapping between different values of one or more configuration parameters in a UL-CG configuration and different UE behaviors. As shown in FIG. 8, example 800 includes a mapping between a UL-CG periodicity (e.g., the periodicity of the periodic UL-CG occasions) and the UE behavior in an UL-CG occasion in which the UE does not have data to transmit. For example, the mapping between the UL-CG periodicity and the UE behavior may be an RRC mapping, which may be indicated in the UL-CG configuration for the UE.

As shown in FIG. 8, different values of the UL-CG periodicity may map to different UE behaviors in a UL-CG occasion in which the UE does not have data to transmit. As shown by reference number 805, a periodicity of one slot (e.g., sym1X14) maps to a UE behavior of transmitting extra parity bits for a last six grants (e.g., parity bits associated with the previous CG uplink occasions transmitted in the last six UL-CG occasions). As shown by reference number 810, a periodicity of four slots (e.g., sym4X14) maps to a UE behavior of transmitting extra parity bits for a last four grants (e.g., parity bits associated with the previous CG uplink occasions transmitted in the last four UL-CG occasions). As shown by reference number 815, a periodicity of eight slots (e.g., sym8X14) maps to a UE behavior of transmitting extra parity bits for a last two grants (e.g., parity bits associated with the previous CG uplink occasions transmitted in the last two UL-CG occasions). As shown by reference number 820, a periodicity of ten slots (e.g., sym10X14) maps to a UE behavior of repetition of a previous CG uplink communication transmitted in a most recent preceding UL-CG occasion. As shown by reference number 825, a periodicity of 20 slots (e.g., sym20X14) maps to a UE behavior of skipping the UL-CG occasion in which the UE does not have data to transmit. In some aspects, the UL-CG configuration may indicate the UL-CG periodicity (e.g., the periodicity of the configured periodic UL-CG occasions), and the UE may perform the UE behavior corresponding to the indicated UL-CG periodicity, in accordance with the mapping, in a UL-CG occasion in which the UE does not have data to transmit.

As indicated above, FIG. 8 is provided as an example. Other examples may differ from what is described with respect to FIG. 8.

Figure 9:
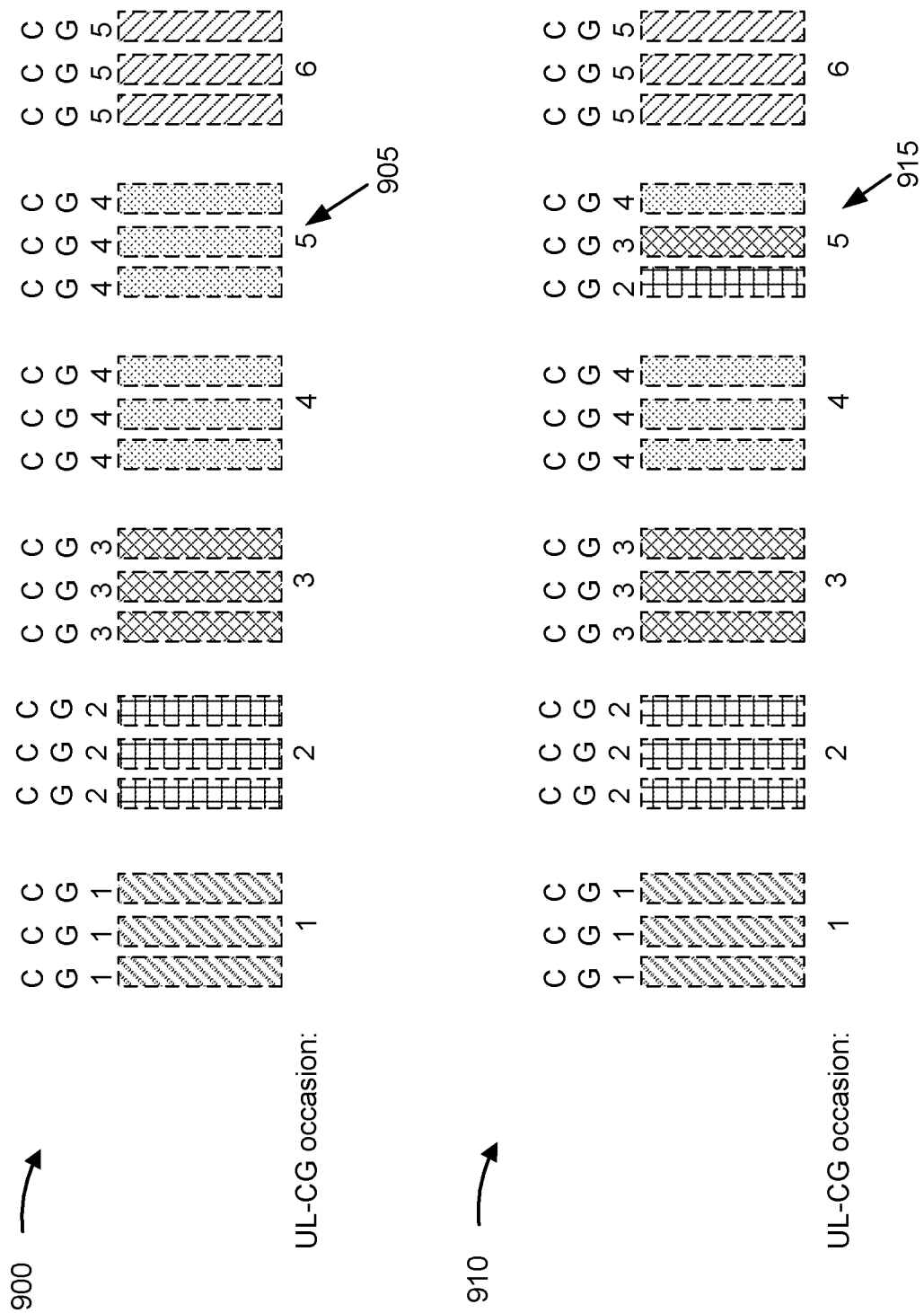

FIG. 9 is a diagram illustrating examples 900 and 910 associated with repurposing skipping in UL-CG to improve uplink coverage, in accordance with the present disclosure. Examples 900 and 910 include CG uplink communications in periodic UL-CG occasions. In some aspects, a UL-CG configuration for a UE may indicate a repetition factor that configures multiple repetition instances in each UL-CG occasion. In examples 900 and 910, the UE is configured with a repetition factor of three, such that each UL-CG occasion includes three repetition instances for repeating the transmission of a CG uplink communication three times.

In example 900, the UE may transmit a first CG uplink communication (CG1) in each of the three repetition instances in a first UL-CG occasion. The UE may transmit a second CG uplink communication (CG2) in each of the three repetition instances in a second UL-CG occasion. The UE may transmit a third CG uplink communication (CG3) in each of the three repetition instances in a third UL-CG occasion. The UE may transmit a fourth CG uplink communication (CG2) in each of the three repetition instances in a fourth UL-CG occasion. The UE may transmit a fifth CG uplink communication (CG5) in each of the three repetition instances in a sixth UL-CG occasion.

In some aspects, the UE may determine that the UE does not have data to transmit (e.g., the amount of data in the uplink buffer of the UE does not satisfy a threshold) in the fifth UL-CG occasion. In some aspects, as shown by reference number 905 in example 900, in a case in which the UE is configured with multiple repetition instances and the UE does not have data to transmit in a UL-CG occasion (e.g., the fifth UL-CG occasion), the UE may use all repetition instances in the UL-CG occasion (e.g., the fifth UL-CG occasion) for improving the coverage of the same previous CG uplink communication (e.g., the CG uplink communication transmitted in the most recent preceding UL-CG configuration). As shown in example 900, the UE may transmit a repetition of CG4 (e.g., the CG uplink communication transmitted in the fourth UL-CG occasion) in each repetition instance of the fifth UL-CG occasion. In this case, the UE may transmit, in the three repetition instances in the fifth UL-CG occasion, three repetitions of CG4.

In example 910, the UE may transmit a first CG uplink communication (CG1) in each of the three repetition instances in a first UL-CG occasion. The UE may transmit a second CG uplink communication (CG2) in each of the three repetition instances in a second UL-CG occasion. The UE may transmit a third CG uplink communication (CG3) in each of the three repetition instances in a third UL-CG occasion. The UE may transmit a fourth CG uplink communication (CG2) in each of the three repetition instances in a fourth UL-CG occasion. The UE may transmit a fifth CG uplink communication (CG5) in each of the three repetition instances in a sixth UL-CG occasion.

In some aspects, the UE may determine that the UE does not have data to transmit (e.g., the amount of data in the uplink buffer of the UE does not satisfy a threshold) in the fifth UL-CG occasion. In some aspects, as shown by reference number 915 in example 910, in a case in which the UE is configured with multiple repetition instances and the UE does not have data to transmit in a UL-CG occasion (e.g., the fifth UL-CG occasion), the UE may use each repetition instance in the UL-CG occasion (e.g., the fifth UL-CG occasion) for repeating a different previous CG uplink communication. As shown in example 910, the UE may transmit, in a first repetition instance in the fifth UL-CG occasion, a repetition of CG2, the UE may transmit, in a second repetition instance in the fifth UL-CG occasion, a repetition of CG3, and the UE may transmit, in a third repetition instance in the fifth UL-CG occasion, a repetition of CG4. In this case, the UE may transmit, in the three repetition instances in the fifth UL-CG occasion, one repetition each for the previous CG communications transmitted in the last three UL-CG occasions (e.g., the second, third, and fourth UL-CG occasions) prior to the fifth UL-CG occasion.

As indicated above, FIG. 9 is provided as an example. Other examples may differ from what is described with respect to FIG. 9.

Figure 10:
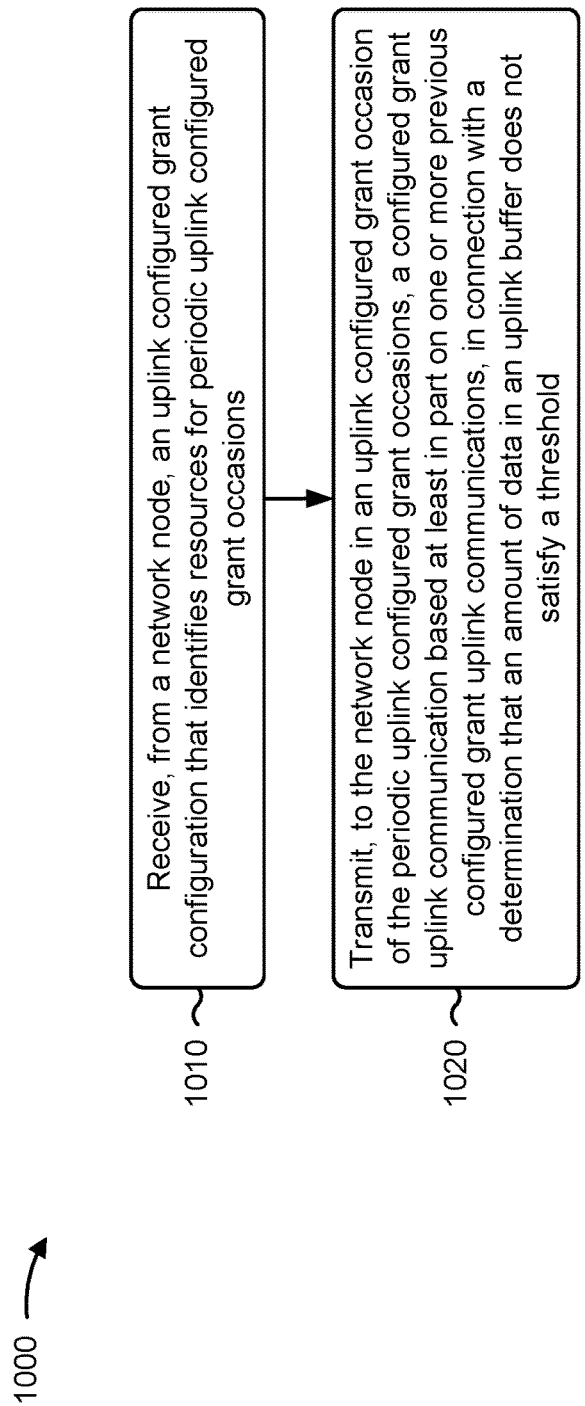
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with repurposing skipping in uplink configured grant to improve uplink coverage.

As shown in FIG. 10, in some aspects, process 1000 may include receiving, from a network node, an uplink configured grant configuration that identifies resources for periodic uplink configured grant occasions (block 1010). For example, the UE (e.g., using communication manager 140 and/or reception component 1202, depicted in FIG. 12) may receive, from a network node, an uplink configured grant configuration that identifies resources for periodic uplink configured grant occasions, as described above.

As further shown in FIG. 10, in some aspects, process 1000 may include transmitting, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold (block 1020). For example, the UE (e.g., using communication manager 140 and/or transmission component 1204, depicted in FIG. 12) may transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold, as described above.

Process 1000 may include additional aspects, such as any single aspect or any combination of aspects described below and/or in connection with one or more other processes described elsewhere herein.

In a first aspect, transmitting the configured grant uplink communication based at least in part on the one or more previous configured grant uplink communications includes transmitting, in the uplink configured grant occasion, a repetition of a previous configured grant uplink communication transmitted in a last uplink configured grant occasion prior to the uplink configured grant occasion.

In a second aspect, alone or in combination with the first aspect, transmitting the configured grant uplink communication based at least in part on the one or more previous configured grant uplink communications includes transmitting, in the uplink configured grant occasion, parity bits associated with previous configured grant uplink communications transmitted in a quantity of latest uplink configured grant occasions prior to the uplink configured grant occasion.

In a third aspect, alone or in combination with one or more of the first and second aspects, process 1000 includes receiving, from the network node, an indication of the quantity of the latest uplink configured grant occasions.

In a fourth aspect, alone or in combination with one or more of the first through third aspects, the uplink configured grant configuration includes an indication of the quantity of the latest uplink configured grant occasions.

In a fifth aspect, alone or in combination with one or more of the first through fourth aspects, the quantity of the latest uplink configured grant occasions is based at least in part on one or more configuration parameters included in the uplink configured grant configuration.

In a sixth aspect, alone or in combination with one or more of the first through fifth aspects, the uplink configured grant configuration indicates a periodicity of the periodic uplink configured grant occasions, and the quantity of the latest uplink configured grant occasions is based at least in part on the periodicity of the periodic uplink configured grant occasions.

In a seventh aspect, alone or in combination with one or more of the first through sixth aspects, the uplink configured grant configuration indicates a mapping between one or more values for the periodicity and one or more quantities of the latest uplink configured grant occasions.

In an eighth aspect, alone or in combination with one or more of the first through seventh aspects, transmitting the configured grant uplink communication based at least in part on the one or more previous configured grant uplink communications includes transmitting, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, based at least in part on a periodicity, indicated in the uplink configured grant configuration, of the periodic uplink configured grant occasions.

In a ninth aspect, alone or in combination with one or more of the first through eighth aspects, transmitting the configured grant uplink communication based at least in part on the one or more previous configured grant uplink communications includes transmitting, in the uplink configured grant occasion, the configured grant uplink communication based at least in part on the one or more previous configured grant uplink communications, in connection with the determination that the amount of data in the uplink buffer does not satisfy the threshold and a determination that a power headroom of the UE satisfies a power threshold.

In a tenth aspect, alone or in combination with one or more of the first through ninth aspects, the uplink configured grant configuration indicates a repetition factor that configures multiple repetition instances in each of the periodic uplink configured grant occasions, and transmitting the configured grant uplink communication based at least in part on the one or more previous configured grant uplink communications includes transmitting, in the multiple repetition instances in the uplink configured grant occasion, multiple repetitions of a previous configured grant uplink communication transmitted in a last uplink configured grant occasion prior to the uplink configured grant occasion.

In an eleventh aspect, alone or in combination with one or more of the first through tenth aspects, the uplink configured grant configuration indicates a repetition factor that configures multiple repetition instances in each of the periodic uplink configured grant occasions, and transmitting the configured grant uplink communication based at least in part on the one or more previous configured grant uplink communications includes transmitting, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

In a twelfth aspect, alone or in combination with one or more of the first through eleventh aspects, process 1000 includes transmitting, to the network node, an indication of whether the configured grant uplink occasion includes a new data transmission or the configured grant uplink communication based at least in part on the one or more previous configured grant uplink communications.

In a thirteenth aspect, alone or in combination with one or more of the first through twelfth aspects, transmitting the configured grant uplink communication based at least in part on the one or more previous configured grant uplink communications includes transmitting, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, wherein the indication indicates whether the uplink configured grant occasion includes the new data transmission, the repetition, or the parity bits.

In a fourteenth aspect, alone or in combination with one or more of the first through thirteenth aspects, the indication is included in configured grant uplink control information associated with the uplink configured grant occasion.

In a fifteenth aspect, alone or in combination with one or more of the first through fourteenth aspects, the indication is included in a payload of a configured grant uplink communication, a direct grant PUSCH communication, or a direct grant PUCCH communication, and the indication indicates a grant identifier associated with the uplink configured grant occasion.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
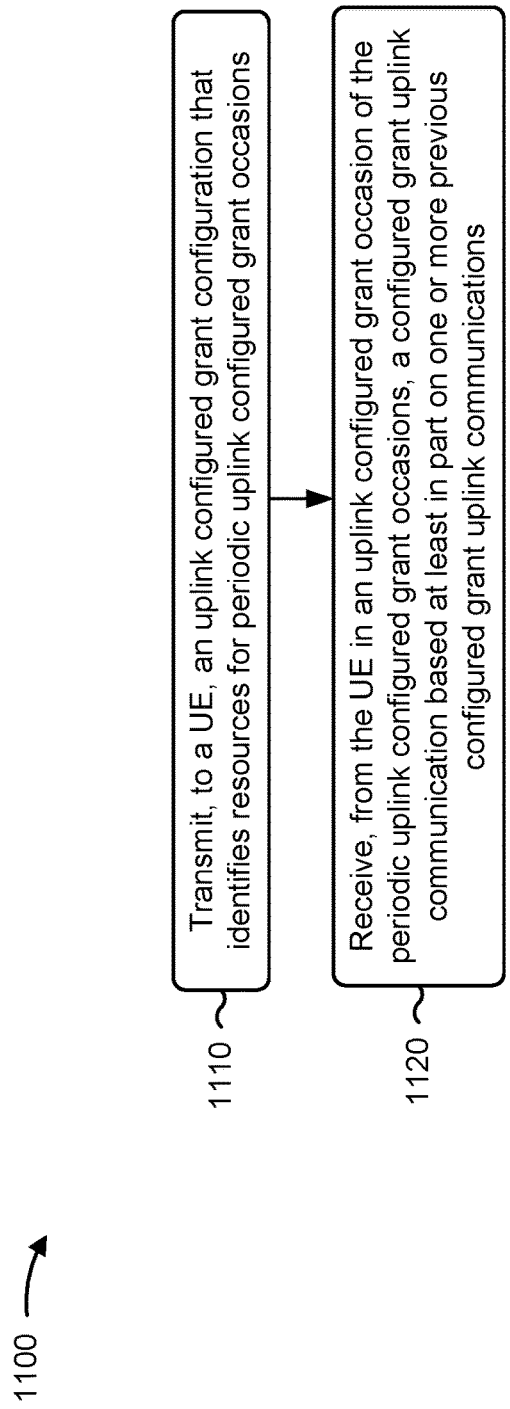
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with repurposing skipping in uplink configured grant to improve uplink coverage.

As shown in FIG. 11, in some aspects, process 1100 may include transmitting, to a UE, an uplink configured grant configuration that identifies resources for periodic uplink configured grant occasions (block 1110). For example, the network node (e.g., using communication manager 150 and/or transmission component 1304, depicted in FIG. 13) may transmit, to a UE, an uplink configured grant configuration that identifies resources for periodic uplink configured grant occasions, as described above.

As further shown in FIG. 11, in some aspects, process 1100 may include receiving, from the UE in an uplink configured grant occasion of the periodic uplink configured grant occasions, a configured grant uplink communication based at least in part on one or more previous configured grant uplink communications (block 1120). For example, the network node (e.g., using communication manager 150 and/or reception component 1302, depicted in FIG. 13) may receive, from the UE in an uplink configured grant occasion of the periodic uplink configured grant occasions, a configured grant uplink communication based at least in part on one or more previous configured grant uplink communications, as described above.

Process 1100 may include additional aspects, such as any single aspect or any combination of aspects described below and/or in connection with one or more other processes described elsewhere herein.

In a first aspect, process 1100 includes decoding at least one previous configured grant uplink communication, of the one or more previous configured grant uplink communications, based at least in part on the configured grant uplink communication received in the uplink configured grant occasion.

In a second aspect, alone or in combination with the first aspect, receiving the configured grant uplink communication based at least in part on the one or more previous configured grant uplink communications includes receiving, in the uplink configured grant occasion, a repetition of a previous configured grant uplink communication transmitted in a last uplink configured grant occasion prior to the uplink configured grant occasion.

In a third aspect, alone or in combination with one or more of the first and second aspects, receiving the configured grant uplink communication based at least in part on the one or more previous configured grant uplink communications includes receiving, in the uplink configured grant occasion, parity bits associated with previous configured grant uplink communications transmitted in a quantity of latest uplink configured grant occasions prior to the uplink configured grant occasion.

In a fourth aspect, alone or in combination with one or more of the first through third aspects, process 1100 includes transmitting, to the UE, an indication of the quantity of the latest uplink configured grant occasions.

In a fifth aspect, alone or in combination with one or more of the first through fourth aspects, the uplink configured grant configuration includes an indication of the quantity of the latest uplink configured grant occasions.

In a sixth aspect, alone or in combination with one or more of the first through fifth aspects, the quantity of the latest uplink configured grant occasions is based at least in part on one or more configuration parameters included in the uplink configured grant configuration.

In a seventh aspect, alone or in combination with one or more of the first through sixth aspects, the uplink configured grant configuration indicates a periodicity of the periodic uplink configured grant occasions, and the quantity of the latest uplink configured grant occasions is based at least in part on the periodicity of the periodic uplink configured grant occasions.

In an eighth aspect, alone or in combination with one or more of the first through seventh aspects, the uplink configured grant configuration indicates a mapping between one or more values for the periodicity and one or more quantities of the latest uplink configured grant occasions.

In a ninth aspect, alone or in combination with one or more of the first through eighth aspects, receiving the configured grant uplink communication based at least in part on the one or more previous configured grant uplink communications includes receiving, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, based at least in part on a periodicity, indicated in the uplink configured grant configuration, of the periodic uplink configured grant occasions.

In a tenth aspect, alone or in combination with one or more of the first through ninth aspects, the uplink configured grant configuration indicates a repetition factor that configures multiple repetition instances in each of the periodic uplink configured grant occasions, and receiving the configured grant uplink communication based at least in part on the one or more previous configured grant uplink communications includes receiving, in the multiple repetition instances in the uplink configured grant occasion, multiple repetitions of a previous configured grant uplink communication transmitted in a last uplink configured grant occasion prior to the uplink configured grant occasion.

In an eleventh aspect, alone or in combination with one or more of the first through tenth aspects, the uplink configured grant configuration indicates a repetition factor that configures multiple repetition instances in each of the periodic uplink configured grant occasions, and receiving the configured grant uplink communication based at least in part on the one or more previous configured grant uplink communications includes receiving, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

In a twelfth aspect, alone or in combination with one or more of the first through eleventh aspects, process 1100 includes receiving, from the UE, an indication of whether the configured grant uplink occasion includes a new data transmission or the configured grant uplink communication based at least in part on the one or more previous configured grant uplink communications.

In a thirteenth aspect, alone or in combination with one or more of the first through twelfth aspects, receiving the configured grant uplink communication based at least in part on the one or more previous configured grant uplink communications includes receiving, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, wherein the indication indicates whether the uplink configured grant occasion includes the new data transmission, the repetition, or the parity bits.

In a fourteenth aspect, alone or in combination with one or more of the first through thirteenth aspects, the indication is included in configured grant uplink control information associated with the uplink configured grant occasion.

In a fifteenth aspect, alone or in combination with one or more of the first through fourteenth aspects, the indication is included in a payload of a configured grant uplink communication, a direct grant PUSCH communication, or a direct grant PUCCH communication, and the indication indicates a grant identifier associated with the uplink configured grant occasion.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
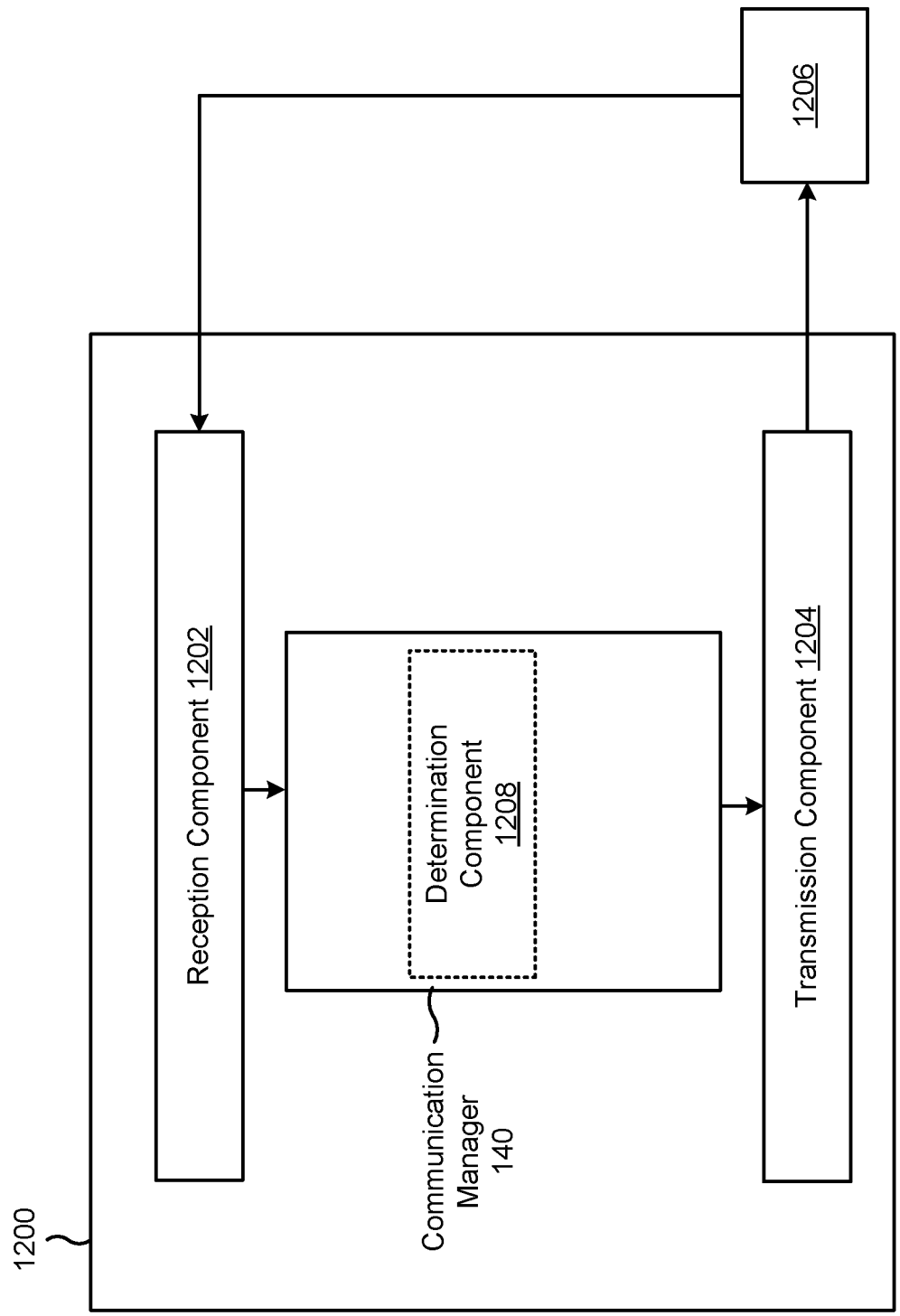
FIGS. 12-13 are diagrams of an example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a determination component 1208, among other examples.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network node, an uplink configured grant configuration that identifies resources for periodic uplink configured grant occasions. The transmission component 1204 may transmit, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

The determination component 1208 may determine whether the amount of data in the uplink buffer satisfies the threshold.

The reception component 1202 may receive, from the network node, an indication of the quantity of the latest uplink configured grant occasions.

The transmission component 1204 may transmit, to the network node, an indication of whether the configured grant uplink occasion includes a new data transmission or the configured grant uplink communication based at least in part on the one or more previous configured grant uplink communications.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
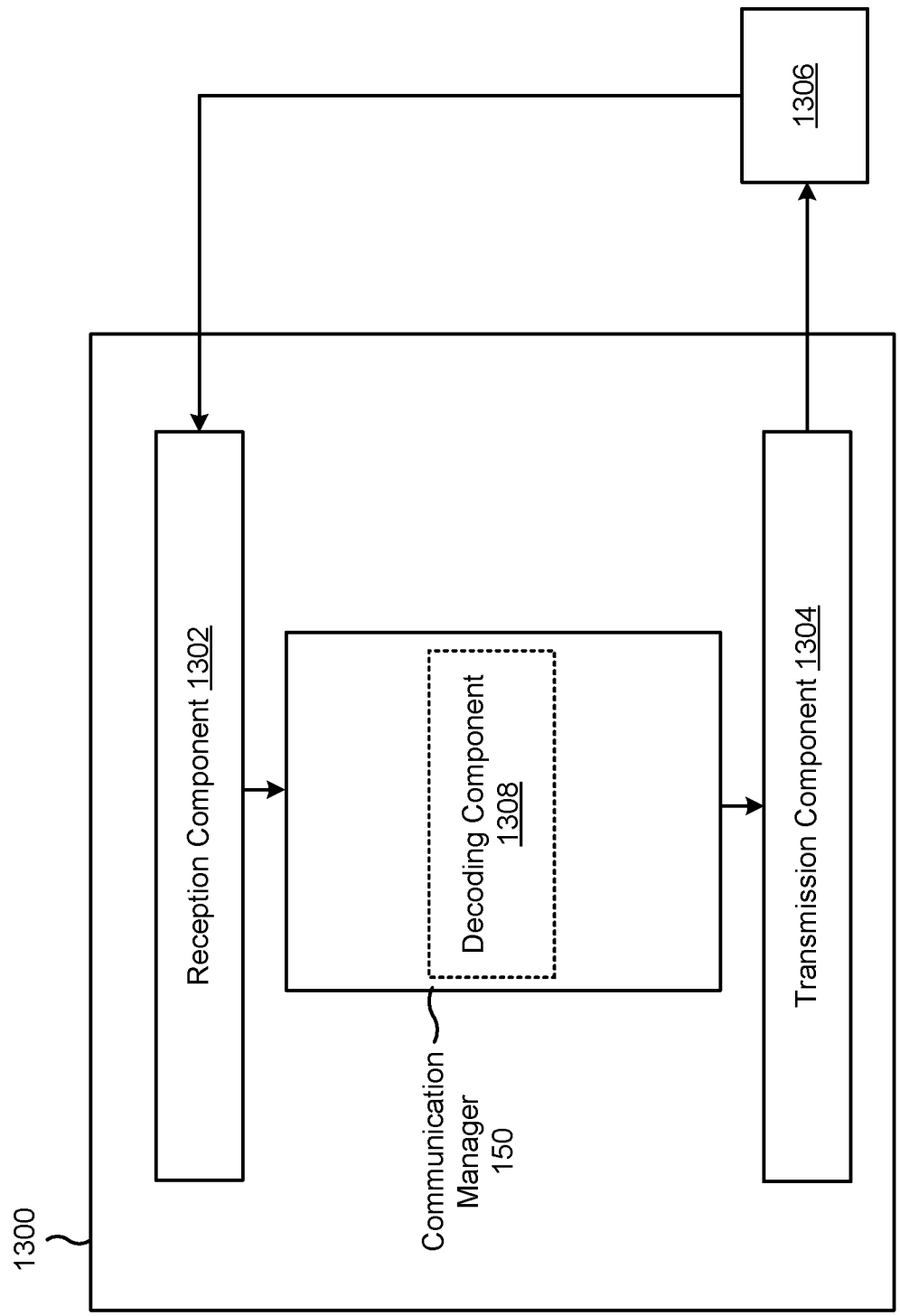

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a decoding component 1308, among other examples.

In some aspects, the apparatus 1300 may be configured to perform one or more operations described herein in connection with FIGS. 5-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The transmission component 1304 may transmit, to a UE, an uplink configured grant configuration that identifies resources for periodic uplink configured grant occasions. The reception component 1302 may receive, from the UE in an uplink configured grant occasion of the periodic uplink configured grant occasions, a configured grant uplink communication based at least in part on one or more previous configured grant uplink communications.

The decoding component 1308 may decode at least one previous configured grant uplink communication, of the one or more previous configured grant uplink communications, based at least in part on the configured grant uplink communication received in the uplink configured grant occasion.

The transmission component 1304 may transmit, to the UE, an indication of the quantity of the latest uplink configured grant occasions.

The reception component 1302 may receive, from the UE, an indication of whether the configured grant uplink occasion includes a new data transmission or the configured grant uplink communication based at least in part on the one or more previous configured grant uplink communications.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network node, an uplink configured grant configuration that identifies resources for periodic uplink configured grant occasions; and transmitting, to the network node in an uplink configured grant occasion of the periodic uplink configured grant occasions, a configured grant uplink communication based at least in part on one or more previous configured grant uplink communications, in connection with a determination that an amount of data in an uplink buffer does not satisfy a threshold.

Aspect 2: The method of Aspect 1, wherein transmitting the configured grant uplink communication based at least in part on the one or more previous configured grant uplink communications comprises: transmitting, in the uplink configured grant occasion, a repetition of a previous configured grant uplink communication transmitted in a last uplink configured grant occasion prior to the uplink configured grant occasion.

Aspect 3: The method of Aspect 1, wherein transmitting the configured grant uplink communication based at least in part on the one or more previous configured grant uplink communications comprises: transmitting, in the uplink configured grant occasion, parity bits associated with previous configured grant uplink communications transmitted in a quantity of latest uplink configured grant occasions prior to the uplink configured grant occasion.

Aspect 4: The method of Aspect 3, further comprising: receiving, from the network node, an indication of the quantity of the latest uplink configured grant occasions.

Aspect 5: The method of any of Aspects 3-4, wherein the uplink configured grant configuration includes an indication of the quantity of the latest uplink configured grant occasions.

Aspect 6: The method of Aspect 3, wherein the quantity of the latest uplink configured grant occasions is based at least in part on one or more configuration parameters included in the uplink configured grant configuration.

Aspect 7: The method of any of Aspects 3 or 6, wherein the uplink configured grant configuration indicates a periodicity of the periodic uplink configured grant occasions, and wherein the quantity of the latest uplink configured grant occasions is based at least in part on the periodicity of the periodic uplink configured grant occasions.

Aspect 8: The method of Aspect 7, wherein the uplink configured grant configuration indicates a mapping between one or more values for the periodicity and one or more quantities of the latest uplink configured grant occasions.

Aspect 9: The method of any of Aspects 1-8, wherein transmitting the configured grant uplink communication based at least in part on the one or more previous configured grant uplink communications comprises: transmitting, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, based at least in part on a periodicity, indicated in the uplink configured grant configuration, of the periodic uplink configured grant occasions.

Aspect 10: The method of any of Aspects 1-9, wherein transmitting the configured grant uplink communication based at least in part on the one or more previous configured grant uplink communications comprises: transmitting, in the uplink configured grant occasion, the configured grant uplink communication based at least in part on the one or more previous configured grant uplink communications, in connection with the determination that the amount of data in the uplink buffer does not satisfy the threshold and a determination that a power headroom of the UE satisfies a power threshold.

Aspect 11: The method of any of Aspects 1-2 and 9-10, wherein the uplink configured grant configuration indicates a repetition factor that configures multiple repetition instances in each of the periodic uplink configured grant occasions, and wherein transmitting the configured grant uplink communication based at least in part on the one or more previous configured grant uplink communications comprises: transmitting, in the multiple repetition instances in the uplink configured grant occasion, multiple repetitions of a previous configured grant uplink communication transmitted in a last uplink configured grant occasion prior to the uplink configured grant occasion.

Aspect 12: The method of any of Aspects 1-2 and 9-10, wherein the uplink configured grant configuration indicates a repetition factor that configures multiple repetition instances in each of the periodic uplink configured grant occasions, and wherein transmitting the configured grant uplink communication based at least in part on the one or more previous configured grant uplink communications comprises: transmitting, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

Aspect 13: The method of Aspects 1-12, further comprising: transmitting, to the network node, an indication of whether the configured grant uplink occasion includes a new data transmission or the configured grant uplink communication based at least in part on the one or more previous configured grant uplink communications.

Aspect 14: The method of Aspect 13, wherein transmitting the configured grant uplink communication based at least in part on the one or more previous configured grant uplink communications comprises: transmitting, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, wherein the indication indicates whether the uplink configured grant occasion includes the new data transmission, the repetition, or the parity bits.

Aspect 15: The method of any of Aspects 13-14, wherein the indication is included in configured grant uplink control information associated with the uplink configured grant occasion.

Aspect 16: The method of any of Aspects 13-14, wherein the indication is included in a payload of a configured grant uplink communication, a direct grant physical uplink shared channel (PUSCH) communication, or a direct grant physical uplink control channel (PUCCH) communication, and wherein the indication indicates a grant identifier associated with the uplink configured grant occasion.

Aspect 17: A method of wireless communication performed by a network node, comprising: transmitting, to a user equipment (UE), an uplink configured grant configuration that identifies resources for periodic uplink configured grant occasions; and receiving, from the UE in an uplink configured grant occasion of the periodic uplink configured grant occasions, a configured grant uplink communication based at least in part on one or more previous configured grant uplink communications.

Aspect 18: The method of Aspect 17, further comprising: decoding at least one previous configured grant uplink communication, of the one or more previous configured grant uplink communications, based at least in part on the configured grant uplink communication received in the uplink configured grant occasion.

Aspect 19: The method of any of Aspects 17-18, wherein receiving the configured grant uplink communication based at least in part on the one or more previous configured grant uplink communications comprises: receiving, in the uplink configured grant occasion, a repetition of a previous configured grant uplink communication transmitted in a last uplink configured grant occasion prior to the uplink configured grant occasion.

Aspect 20: The method of any of Aspects 17-18, wherein receiving the configured grant uplink communication based at least in part on the one or more previous configured grant uplink communications comprises: receiving, in the uplink configured grant occasion, parity bits associated with previous configured grant uplink communications transmitted in a quantity of latest uplink configured grant occasions prior to the uplink configured grant occasion.

Aspect 21: The method of Aspect 20, further comprising: transmitting, to the UE, an indication of the quantity of the latest uplink configured grant occasions.

Aspect 22: The method of any of Aspects 20-21, wherein the uplink configured grant configuration includes an indication of the quantity of the latest uplink configured grant occasions.

Aspect 23: The method of Aspect 20, wherein the quantity of the latest uplink configured grant occasions is based at least in part on one or more configuration parameters included in the uplink configured grant configuration.

Aspect 24: The method of any of Aspects 20 or 23, wherein the uplink configured grant configuration indicates a periodicity of the periodic uplink configured grant occasions, and wherein the quantity of the latest uplink configured grant occasions is based at least in part on the periodicity of the periodic uplink configured grant occasions.

Aspect 25: The method of Aspect 24, wherein the uplink configured grant configuration indicates a mapping between one or more values for the periodicity and one or more quantities of the latest uplink configured grant occasions.

Aspect 26: The method of any of Aspects 17-25, wherein receiving the configured grant uplink communication based at least in part on the one or more previous configured grant uplink communications comprises: receiving, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, based at least in part on a periodicity, indicated in the uplink configured grant configuration, of the periodic uplink configured grant occasions.

Aspect 27: The method of any of Aspects 17-19 and 26, wherein the uplink configured grant configuration indicates a repetition factor that configures multiple repetition instances in each of the periodic uplink configured grant occasions, and wherein receiving the configured grant uplink communication based at least in part on the one or more previous configured grant uplink communications comprises: receiving, in the multiple repetition instances in the uplink configured grant occasion, multiple repetitions of a previous configured grant uplink communication transmitted in a last uplink configured grant occasion prior to the uplink configured grant occasion.

Aspect 28: The method of any of Aspects 17-19 and 26, wherein the uplink configured grant configuration indicates a repetition factor that configures multiple repetition instances in each of the periodic uplink configured grant occasions, and wherein receiving the configured grant uplink communication based at least in part on the one or more previous configured grant uplink communications comprises: receiving, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

Aspect 29: The method of any of Aspects 17-28, further comprising: receiving, from the UE, an indication of whether the configured grant uplink occasion includes a new data transmission or the configured grant uplink communication based at least in part on the one or more previous configured grant uplink communications.

Aspect 30: The method of Aspect 29, wherein receiving the configured grant uplink communication based at least in part on the one or more previous configured grant uplink communications comprises: receiving, in the uplink configured grant occasion, one of a repetition of a previous configured grant uplink communication transmitted in a last uplink configured grant occasion prior to the uplink configured grant occasion, or parity bits associated with previous configured grant uplink communications transmitted in a quantity of latest uplink configured grant occasions prior to the uplink configured grant occasion, wherein the indication indicates whether the uplink configured grant occasion includes the new data transmission, the repetition, or the parity bits.

Aspect 31: The method of any of Aspects 29-30, wherein the indication is included in configured grant uplink control information associated with the uplink configured grant occasion.

Aspect 32: The method of any of Aspects 29-30, wherein the indication is included in a payload of a configured grant uplink communication, a direct grant physical uplink shared channel (PUSCH) communication, or a direct grant physical uplink control channel (PUCCH) communication, and wherein the indication indicates a grant identifier associated with the uplink configured grant occasion.

Aspect 33: An apparatus for wireless communication at a device, comprising a processor; memory coupled with the processor; and instructions stored in the memory and executable by the processor to cause the apparatus to perform the method of one or more of Aspects 1-16.

Aspect 34: A device for wireless communication, comprising a memory and one or more processors coupled to the memory, the one or more processors configured to perform the method of one or more of Aspects 1-16.

Aspect 35: An apparatus for wireless communication, comprising at least one means for performing the method of one or more of Aspects 1-16.

Aspect 36: A non-transitory computer-readable medium storing code for wireless communication, the code comprising instructions executable by a processor to perform the method of one or more of Aspects 1-16.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: An apparatus for wireless communication at a device, comprising a processor; memory coupled with the processor; and instructions stored in the memory and executable by the processor to cause the apparatus to perform the method of one or more of Aspects 17-32.

Aspect 39: A device for wireless communication, comprising a memory and one or more processors coupled to the memory, the one or more processors configured to perform the method of one or more of Aspects 17-32.

Aspect 40: An apparatus for wireless communication, comprising at least one means for performing the method of one or more of Aspects 17-32.

Aspect 41: A non-transitory computer-readable medium storing code for wireless communication, the code comprising instructions executable by a processor to perform the method of one or more of Aspects 17-32.

Aspect 42: A non-transitory computer-readable medium storing a set of instructions for wireless communication, the set of instructions comprising one or more instructions that, when executed by one or more processors of a device, cause the device to perform the method of one or more of Aspects 17-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, an uplink configured grant configuration that identifies resources for periodic uplink configured grant occasions; and
      transmit, to the network node in an uplink configured grant occasion of the periodic uplink configured grant occasions, a configured grant uplink communication including a set of parity bits corresponding to one or more previous configured grant uplink communications, in connection with a determination that an amount of data in an uplink buffer does not satisfy a threshold.

2. The UE of claim 1, wherein the one or more processors, to transmit the configured grant uplink communication, are configured to:
   transmit, in the uplink configured grant occasion, a repetition of a previous configured grant uplink communication of the one or more previous configured grant uplink communications, the previous configured grant uplink communication corresponding to a last uplink configured grant occasion prior to the uplink configured grant occasion.

3. The UE of claim 1, wherein the one or more previous configured grant uplink communications correspond to a quantity of latest uplink configured grant occasions prior to the uplink configured grant occasion.

4. The UE of claim 3, wherein the one or more processors are further configured to:
   receive, from the network node, an indication of the quantity of the latest uplink configured grant occasions.

5. The UE of claim 3, wherein the uplink configured grant configuration includes an indication of the quantity of the latest uplink configured grant occasions.

6. The UE of claim 3, wherein the quantity of the latest uplink configured grant occasions is based at least in part on one or more configuration parameters included in the uplink configured grant configuration.

7. The UE of claim 3, wherein the uplink configured grant configuration indicates a periodicity of the periodic uplink configured grant occasions, and wherein the quantity of the latest uplink configured grant occasions is based at least in part on the periodicity of the periodic uplink configured grant occasions.

8. The UE of claim 7, wherein the uplink configured grant configuration indicates a mapping between one or more values for the periodicity and one or more quantities of the latest uplink configured grant occasions.

9. The UE of claim 1, wherein the one or more processors, to transmit the configured grant uplink communication, are configured to:
   transmit, in the uplink configured grant occasion, one of a repetition of a previous configured grant uplink communication of the one or more previous configured grant uplink communications, or the set of parity bits, wherein the one or more previous configured grant uplink communications are transmitted in a quantity of latest uplink configured grant occasions prior to the uplink configured grant occasion, based at least in part on a periodicity, indicated in the uplink configured grant configuration, of the periodic uplink configured grant occasions.

10. The UE of claim 1, wherein the one or more processors, to transmit the configured grant uplink communication, are configured to:
    transmit, in the uplink configured grant occasion, the configured grant uplink communication based at least in part on the one or more previous configured grant uplink communications, in connection with the determination that the amount of data in the uplink buffer does not satisfy the threshold and a determination that a power headroom of the UE satisfies a power threshold.

11. The UE of claim 1, wherein the uplink configured grant configuration indicates a repetition factor that configures multiple repetition instances in each of the periodic uplink configured grant occasions, and wherein the one or more processors, to transmit the configured grant uplink communication, are configured to:
    transmit, in the multiple repetition instances in the uplink configured grant occasion, multiple repetitions of a previous configured grant uplink communication of the one or more previous configured grant communications, the one or more previous configured grant communications corresponding to a last uplink configured grant occasion prior to the uplink configured grant occasion.

12. The UE of claim 1, wherein the uplink configured grant configuration indicates a repetition factor that configures multiple repetition instances in each of the periodic uplink configured grant occasions, and wherein the one or more processors, to transmit the configured grant uplink communication, are configured to:
    transmit, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

13. The UE of claim 1, wherein the one or more processors are further configured to:
transmit, to the network node, an indication of whether the configured grant uplink occasion includes a new data transmission or the configured grant uplink communication based at least in part on the one or more previous configured grant uplink communications.

14. The UE of claim 13, wherein the one or more processors, to transmit the configured grant uplink communication, are configured to:
transmit, in the uplink configured grant occasion, one of a repetition of a previous configured grant uplink communication of the one or more previous configured grant uplink communications, or the set of parity bits, wherein the one or more previous configured grant uplink communications are transmitted in a quantity of latest uplink configured grant occasions prior to the uplink configured grant occasion, wherein the indication indicates whether the uplink configured grant occasion includes the new data transmission, the repetition, or the set of parity bits.

15. The UE of claim 13, wherein the indication is included in configured grant uplink control information associated with the uplink configured grant occasion.

16. The UE of claim 13, wherein the indication is included in a payload of a configured grant uplink communication, a direct grant physical uplink shared channel (PUSCH) communication, or a direct grant physical uplink control channel (PUCCH) communication, and wherein the indication indicates a grant identifier associated with the uplink configured grant occasion.

17. A network node for wireless communication, comprising:
one or more memories; and
one or more processors, coupled to the one or more memories, configured to:
transmit, to a user equipment (UE), an uplink configured grant configuration that identifies resources for periodic uplink configured grant occasions; and
receive, from the UE in an uplink configured grant occasion of the periodic uplink configured grant occasions, a configured grant uplink communication including a set of parity bits corresponding to one or more previous configured grant uplink communications.

18. The network node of claim 17, wherein the one or more processors are further configured to:
decode at least one previous configured grant uplink communication, of the one or more previous configured grant uplink communications, based at least in part on the configured grant uplink communication received in the uplink configured grant occasion.

19. The network node of claim 17, wherein the one or more processors, to receive the configured grant uplink communication, are configured to:
receive, in the uplink configured grant occasion, a repetition of a previous configured grant uplink communication of the one or more previous configured grant uplink communications, the previous configured grant uplink communication corresponding to a last uplink configured grant occasion prior to the uplink configured grant occasion.

20. The network node of claim 17, wherein the one or more previous configured grant uplink communications correspond to a quantity of latest uplink configured grant occasions prior to the uplink configured grant occasion.

21. The network node of claim 17, wherein the uplink configured grant configuration indicates a repetition factor that configures multiple repetition instances in each of the periodic uplink configured grant occasions, and wherein the one or more processors, to receive the configured grant uplink communication, are configured to:
receive, in the multiple repetition instances in the uplink configured grant occasion, multiple repetitions of a previous configured grant uplink communication of the one or more previous configured grant communications, the previous configured grant communication corresponding to a last uplink configured grant occasion prior to the uplink configured grant occasion.

22. The network node of claim 17, wherein the uplink configured grant configuration indicates a repetition factor that configures multiple repetition instances in each of the periodic uplink configured grant occasions, and wherein the one or more processors, to receive the configured grant uplink communication, are configured to:
receive, in the multiple repetition instances in the uplink configured grant occasion, repetitions of multiple previous configured grant uplink communications transmitted in multiple uplink configured grant occasions preceding the uplink configured grant occasion, wherein a repetition of each previous configured grant uplink communication, of the multiple previous configured grant uplink communications, is transmitted in a respective repetition instance of the multiple repetition instances in the uplink configured grant occasion.

23. The network node of claim 17, wherein the one or more processors are further configured to:
receive, from the UE, an indication of whether the configured grant uplink occasion includes a new data transmission or the configured grant uplink communication based at least in part on the one or more previous configured grant uplink communications.

24. A method of wireless communication performed by a user equipment (UE), comprising:
receiving, from a network node, an uplink configured grant configuration that identifies resources for periodic uplink configured grant occasions; and
transmitting, to the network node in an uplink configured grant occasion of the periodic uplink configured grant occasions, a configured grant uplink communication including a set of parity bits corresponding to one or more previous configured grant uplink communications, in connection with a determination that an amount of data in an uplink buffer does not satisfy a threshold.

25. The method of claim 24, wherein transmitting the configured grant uplink communication comprises:
transmitting, in the uplink configured grant occasion, a repetition of a previous configured grant uplink communication of the one or more previous configured grant uplink communications, the previous configured grant uplink communication corresponding to a last uplink configured grant occasion prior to the uplink configured grant occasion.

26. The method of claim 24, wherein the one or more previous configured grant uplink communications correspond to a quantity of latest uplink configured grant occasions prior to the uplink configured grant occasion.

27. The method of claim 24, wherein transmitting the configured grant uplink communication comprises:
transmitting, in the uplink configured grant occasion, the configured grant uplink communication based at least in part on the one or more previous configured grant uplink communications, in connection with the determination that the amount of data in the uplink buffer does not satisfy the threshold and a determination that a power headroom of the UE satisfies a power threshold.

28. The method of claim 24, further comprising:
transmitting, to the network node, an indication of whether the configured grant uplink occasion includes a new data transmission or the configured grant uplink communication based at least in part on the one or more previous configured grant uplink communications.

29. A method of wireless communication performed by a network node, comprising:
transmitting, to a user equipment (UE), an uplink configured grant configuration that identifies resources for periodic uplink configured grant occasions; and
receiving, from the UE in an uplink configured grant occasion of the periodic uplink configured grant occasions, a configured grant uplink communication including a set of parity bits corresponding to one or more previous configured grant uplink communications.

30. The method of claim 29, further comprising:
decoding at least one previous configured grant uplink communication, of the one or more previous configured grant uplink communications, based at least in part on the configured grant uplink communication received in the uplink configured grant occasion.

\* \* \* \* \*